(12) United States Patent
Nakayama et al.

(10) Patent No.: US 11,226,408 B2
(45) Date of Patent: Jan. 18, 2022

(54) SENSOR, ESTIMATING DEVICE, ESTIMATING METHOD, AND RECORDING MEDIUM

(71) Applicant: PANASONIC INTELLECTUAL PROPERTY MANAGEMENT CO., LTD., Osaka (JP)

(72) Inventors: Takeshi Nakayama, Hyogo (JP); Shoichi Iizuka, Osaka (JP); Naoki Honma, Iwate (JP); Dai Sasakawa, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 428 days.

(21) Appl. No.: 16/454,243

(22) Filed: Jun. 27, 2019

(65) Prior Publication Data
US 2020/0011988 A1    Jan. 9, 2020

(51) Int. Cl.
*G01S 13/58* (2006.01)
*G01S 13/52* (2006.01)
*G01S 7/41* (2006.01)

(52) U.S. Cl.
CPC .............. *G01S 13/58* (2013.01); *G01S 7/415* (2013.01); *G01S 13/52* (2013.01)

(58) Field of Classification Search
CPC ........... G01S 13/58; G01S 13/52; G01S 7/415
(Continued)

(56) References Cited

U.S. PATENT DOCUMENTS 7,817,082 B2 * 10/2010 Dwelly ................. G01S 13/532
                                                            342/90
8,890,684 B2 * 11/2014 Tkachenko ........ G06K 7/10425
                                                            340/539.13
(Continued)

FOREIGN PATENT DOCUMENTS

JP    2002-197463    7/2002
JP    2008-275324    11/2008
(Continued)

OTHER PUBLICATIONS

Joachim H.G. Ender, On compressive sensing applied to radar, Signal Processing, vol. 90, Issue 5, (Year: 2009).*
(Continued)

*Primary Examiner* — Bernarr E Gregory
*Assistant Examiner* — Alexander L. Syrkin
(74) *Attorney, Agent, or Firm* — Greenblum & Bernstein, P.L.C.

(57) ABSTRACT

A sensor includes: a transmission signal generator including N transmission antenna elements that respectively transmit N transmission signals to a predetermined range in which a living body is possibly present, where N is a natural number greater than or equal to 3; a receiver including M reception antenna elements that respectively receive N reception signals including one or more reflected signals, where M is a natural number greater than or equal to 3, the one or more reflected signals being one or more of the N transmission signals transmitted by the N transmission antenna elements that is reflected or scattered by the living body; circuitry; and memory. The circuitry estimates traveling of the living body, and/or the posture and/or action of the living body at the position of the living body.

13 Claims, 21 Drawing Sheets

(58) Field of Classification Search
USPC .......................................................... 342/118
See application file for complete search history.

(56) References Cited

U.S. PATENT DOCUMENTS

| | | | |
|---|---|---|---|
| 9,176,223 B2* | 11/2015 | Derham | ................. G01S 7/412 |
| 9,291,707 B2* | 3/2016 | Nohara | ................. G01S 13/726 |
| 2011/0240750 A1 | 10/2011 | Tokura | |
| 2013/0093616 A1* | 4/2013 | Jeon | ........................ G01S 13/66 |
| | | | 342/118 |
| 2013/0335257 A1 | 12/2013 | Abrahamson | |
| 2016/0000359 A1 | 1/2016 | Li et al. | |
| 2016/0025847 A1 | 1/2016 | Okuya et al. | |
| 2016/0077123 A1 | 3/2016 | Kagaya et al. | |
| 2017/0139043 A1 | 5/2017 | Takada | |
| 2018/0011169 A1 | 1/2018 | Nakayama et al. | |

FOREIGN PATENT DOCUMENTS

| | | |
|---|---|---|
| JP | 2011-215031 | 10/2011 |
| JP | 2014-512526 | 5/2014 |
| JP | 2015-117972 | 6/2015 |
| JP | 2016-059458 | 4/2016 |
| JP | 2016-525895 | 9/2016 |
| JP | 2018-008021 | 1/2018 |
| WO | 2012/125100 A1 | 9/2012 |
| WO | 2014/141519 A1 | 9/2014 |
| WO | 2015/100706 A1 | 7/2015 |
| WO | 2015/151507 A1 | 10/2015 |

OTHER PUBLICATIONS

S. Pisa, E. Pittella and E. Piuzzi, "A survey of radar systems for medical applications," in IEEE Aerospace and Electronic Systems Magazine, vol. 31, No. 11, pp. 64-81, Nov. 2016, doi: 10.1109/MAES.2016.140167. (Year: 2016).*

* cited by examiner

FIG. 3

| PREVIOUS POSTURE | PREVIOUS POSTURE AVERAGE DOPPLER RCS VALUE | NEXT POSTURE (TENTATIVE) | DOPPLER RCS THRESHOLD |
|---|---|---|---|
| STANDING | MEDIUM (BODY MOTION COMPONENT) | WALKING | 150 % |
| STANDING | MEDIUM (BODY MOTION COMPONENT) | SITTING | 150 % |
| SITTING IN CHAIR | SMALL | STANDING | 150 % |
| SITTING IN CHAIR | SMALL | RECUMBENT | 150 % |
| SITTING ON GROUND | SMALL | STANDING | 150 % |
| SITTING ON GROUND | SMALL | RECUMBENT | 150 % |
| RECUMBENT | VERY SMALL | STANDING | 150 % |
| RECUMBENT | VERY SMALL | SITTING | 150 % |
| RECUMBENT | VERY SMALL | ROLLING OVER | 150 % |

FIG. 14

| PREVIOUS POSTURE | NEXT POSTURE (TRANSITIONABLE POSTURE) | ACTION |
|---|---|---|
| STANDING | RECUMBENT | FALLING DOWN |
| STANDING | SITTING | TAKING A SEAT |
| SITTING (CHAIR) | STANDING | STANDING |
| SITTING (CHAIR) | RECUMBENT | SLEEPING |
| RECUMBENT | STANDING | GETTING UP |
| RECUMBENT | SITTING | SITTING |
| RECUMBENT | ROLLING OVER | ROLLING OVER |

SENSOR, ESTIMATING DEVICE, ESTIMATING METHOD, AND RECORDING MEDIUM

CROSS REFERENCE TO RELATED APPLICATION

This application claims the benefit of priority of Japanese Patent Application Number 2018-126821 filed on Jul. 3, 2018 and Japanese Patent Application Number 2019-045211 filed on Mar. 12, 2019, the entire contents of which are hereby incorporated by reference.

BACKGROUND

1. Technical Field

The present disclosure relates to, for example, a sensor that estimates a state, such as the posture and/or action of a living body, by using radio signals.

2. Description of the Related Art

A method that uses radio signals is being considered as a method for knowing the position of a person (see, for example, Japanese Unexamined Patent Application Publication (Translation of PCT Application) No. 2014-512526, WO 2014/141519, and Japanese Unexamined Patent Application Publication No. 2015-117972). Japanese Unexamined Patent Application Publication (Translation of PCT Application) No. 2014-512526 discloses a method of detecting a living body by using a Doppler sensor, and WO 2014/141519 discloses a method of detecting an action of a person and/or living body information by using a Doppler sensor and a filter. Japanese Unexamined Patent Application Publication No. 2015-117972 discloses a technique for knowing the position and/or state of a person, which is a target to be detected through analysis of components including Doppler shifts, by using Fourier transform. Japanese Unexamined Patent Application Publication No. 2011-215031 discloses a device that estimates the state of a person by using a Doppler sensor, Japanese Unexamined Patent Application Publication No. 2018-8021 discloses a device that estimates the posture of a person by using a state estimating device, and Japanese Unexamined Patent Application Publication No. 2008-275324 discloses a device that estimates the position of a person and/or the position of an object via a camera and/or RF tag.

SUMMARY

However, improvement of the estimation of the state of a living body, such as the posture and/or action of a living body, by using radio signals, is desired.

In order to achieve the above object, a sensor according to one aspect of the present disclosure includes: a transmission signal generator including N transmission antenna elements that respectively transmit N transmission signals to a predetermined range in which a living body is possibly present, where N is a natural number greater than or equal to 3; a receiver including M reception antenna elements that respectively receive N reception signals including one or more reflected signals, where M is a natural number greater than or equal to 3, the one or more reflected signals being one or more of the N transmission signals transmitted by the N transmission antenna elements that is reflected or scattered by the living body; circuitry; and memory. The circuitry includes; a first matrix calculation unit configured to calculate, for each of N×M possible antenna element combinations of one of the N transmission antenna elements and one of the M reception antenna elements, a complex transfer function indicating a propagation characteristic between the transmission antenna element and the reception antenna element in the combination to obtain N×M complex transfer functions, from the N reception signals received in a predetermined period by the M reception antenna elements, to successively calculate an N×M first matrix whose components are the N×M complex transfer functions calculated; a second matrix extraction unit configured to successively extract a second matrix corresponding to components affected by vital activity including at least any one of a respiration, a heartbeat, and a body motion of the living body, by successively extracting a matrix corresponding to a predetermined frequency range in the N×M first matrix successively calculated by the first matrix calculation unit; a presence determination unit configured to determine whether a living body is present in the predetermined range by using a predetermined method; a position estimation unit configured to, after the presence determination unit determines that a living body is present in the predetermined range, successively estimate a position of the living body relative to the sensor, by using the second matrix successively extracted by the second matrix extraction unit; a Doppler radar cross section (RCS) calculation unit configured to (i) successively calculate a first distance and a second distance based on the position of the living, body successively estimated by the position estimation unit, a position of the transmission signal generator, and a position of the receiver, the first distance indicating a distance between the transmission signal generator and the position of the living body successively estimated, and the second distance indicating a distance between the living body and the receiver, and (ii) successively calculate a Doppler RCS value for the living body, by using the first distance and the second distance calculated; a travel determination unit configured to store the position of the living body successively estimated into the memory a predetermined number of times, sequentially in order of estimation, and based on the positions of the living body stored the predetermined number of times into the memory, determine that the living body is traveling when a positional displacement of the living body is greater than or equal to a predetermined value, and determine that the living body is not traveling when the positional displacement is less than the predetermined value; a Doppler RCS threshold setting unit configured to set a Doppler RCS threshold by using a predetermined method; a Doppler RCS threshold determination unit configured to determine whether or not the Doppler RCS value calculated is less than or equal to the Doppler RCS threshold set, by comparing the Doppler RCS value and the Doppler RCS threshold; and a state estimation unit configured to selectively perform at least one of estimation of a posture of the living body and estimation of an action of the living body, in accordance with at least one of a determination result according to the travel determination unit and a determination result according to the Doppler RCS threshold determination unit.

Note that the present disclosure can be implemented not only as a sensor, but also as an integrated circuit including the processing units included in such a sensor, a method including steps of processes performed by the processing units included in the sensor, a computer program that causes a computer to execute the steps, and as information, data, or signal indicating such a computer program. The program, information, data, and signal may be distributed via a recording medium such as a CD-ROM, or a communication medium, such as the internet.

According to the present disclosure, it is possible to rapidly and highly precisely estimate the state of a living body by using radio signals.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 illustrates a table of set values of the Doppler RCS threshold in the sensor according to Embodiment 1;

FIG. 14 illustrates one example of previous postures, and transitionable postures and actions in the action estimation unit according to Embodiment 1;

DETAILED DESCRIPTION OF THE EMBODIMENTS

Figure 1:
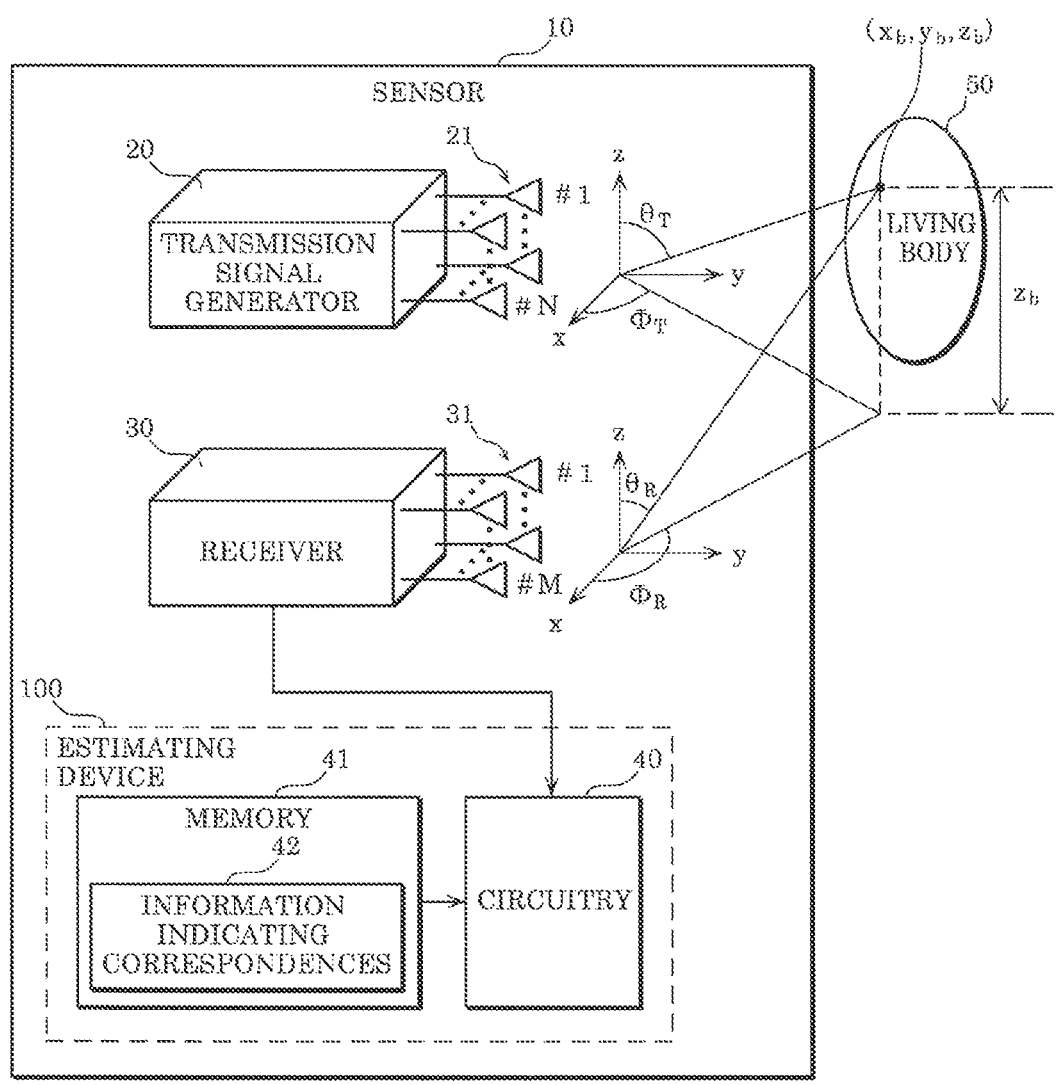
FIG. 1 is a block diagram illustrating one example of a configuration of a sensor according to Embodiment 1.

Underlying Knowledge Forming Basis of Present Invention

The inventors conducted detailed research regarding background art related to estimating a state of a living body, such as the posture and/or action of a living body, by using radio signals. As a result, the inventors found a problem with the methods according to Japanese Unexamined Patent Application Publication (Translation of PCT Application) No. 2014-512526 and WO 2014/141519, namely that although the presence or absence of a person can be detected, the direction in which the person is present, the position of the person, the size of the person, and the posture of the person, for example, cannot be detected.

The inventors also found a problem with the method disclosed in Japanese Unexamined Patent Application Publication No. 2015-117972 that it is difficult to rapidly and highly precisely detect the direction in which a living body, such as a person, is present, and/or the position of the living body. This is because, in order to observe, via Fourier transform, changes in frequency resulting from the Doppler effect originating from organic activity, which are extremely small, it is necessary to observe the living body while the living body is still for a long period of time (for example, for tens of seconds). This is also because, typically, living bodies rarely remain in the same posture or position over tens of seconds.

The inventors also found a problem with Japanese Unexamined Patent Application Publication No. 2011-215031 that, although a device that estimates the presence/absence, respiration, activity states of a person by using a Doppler sensor is disclosed, there is no way to know the posture of the user with the disclosed techniques. The inventors also found a problem with Japanese Unexamined Patent Application Publication No. 2018-8021 that, although it is possible to estimate the posture of a person by using a sensor, it is not possible to determine whether, for example, the person is traveling or not or whether the person is active or not. The inventors also found a problem with Japanese Unexamined Patent Application Publication No. 2008-275324 that, although a device that estimates the traveling of a person or package by using, for example, an electronic tag or camera image, but with the disclosed techniques, there are privacy issues since images are captured.

After much research pertaining to the above problems, the inventors arrived at the present disclosure by discovering that it is possible to rapidly and highly precisely estimate the state of a living body, as indicated by, for example, the traveling of the living body, the posture of the living body at the position of the living body, and the action of the living body, by estimating the direction, position, and size of the living body by using the propagation characteristics and scattered cross sections (Doppler radar cross section (RCS)) of signals transmitted by a transmission signal generator including antenna elements placed in different positions and reflected off the living body (i.e., reflected signals).

In other words, a sensor according to one aspect of the present disclosure includes: a transmission signal generator including N transmission antenna elements that respectively transmit N transmission signals to a predetermined range in which a living body is possibly present, where N is a natural number greater than or equal to 3; a receiver including M reception antenna elements that respectively receive N reception signals including one or more reflected signals, where M is a natural number greater than or equal to 3, the one or more reflected signals being one or more of the N transmission signals transmitted by the N transmission antenna elements that is reflected or scattered by the living body; circuitry; and memory. The circuitry includes: a first matrix calculation unit configured to calculate, for each of N×M possible antenna element combinations of one of the N transmission antenna elements and one of the M reception antenna elements, a complex transfer function indicating a propagation characteristic between the transmission antenna element and the reception antenna element in the combination to obtain N×M complex transfer functions, from the N reception signals received in a predetermined period by the M reception antenna elements, to successively calculate an N×M first matrix whose components are the N×M complex transfer functions calculated; a second matrix extraction unit configured to successively extract a second matrix corresponding to components affected by vital activity including at least any one of a respiration, a heartbeat, and a body motion of the living body, by successively extracting a matrix corresponding to a predetermined frequency range in the N×M first matrix successively calculated by the first matrix calculation unit; a presence determination unit configured to determine whether a living body is present in the predetermined range by using a predetermined method; a position estimation unit configured to, after the presence determination unit determines that a living body is present in the predetermined range, successively estimate a position of the living body relative to the sensor, by using the second matrix successively extracted by the second matrix extraction unit; a Doppler radar cross section (RCS) calculation unit configured to (i) successively calculate a first distance and a second distance based on the position of the living body successively estimated by the position estimation unit, a position of the transmission signal generator, and a position of the receiver, the first distance indicating a distance between the transmission signal generator and the position of the living body successively estimated, and the second distance indicating a distance between the living body and the receiver, and (ii) successively calculate a Doppler RCS value for the living body, by using the first distance and the second distance calculated; a travel determination unit configured to store the position of the living body successively estimated into the memory a predetermined number of times, sequentially in order of estimation, and based on the positions of the living body stored the predetermined number of times into the memory, determine that the living body is traveling when a positional displacement of the living body is greater than or equal to a predetermined value, and determine that the living body is not traveling when the positional displacement is less than the predetermined value; a Doppler RCS threshold setting unit configured to set a Doppler RCS threshold by using a predetermined method; a Doppler RCS threshold determination unit configured to determine whether or not the Doppler RCS value calculated is less than or equal to the Doppler RCS threshold set, by comparing the Doppler RCS value and the Doppler RCS threshold; and a state estimation unit configured to selectively perform at least one of estimation of a posture of the living body and estimation of an action of the living body, in accordance with at least one of a determination result according to the travel determination unit and a determination result according to the Doppler RCS threshold determination unit.

Accordingly, the state of a living body, which is any one of the traveling of a living body, the posture of a living body, and the action of a living body, can be rapidly and highly precisely estimated.

The state estimation unit may be configured to: estimate the posture of the living body when the travel determination unit determines that the living body is not traveling and the Doppler RCS threshold determination unit determines that the Doppler RCS value is less than or equal to the Doppler RCS threshold; and estimate the action of the living body when the Doppler RCS threshold determination unit determines that the Doppler RCS value is greater than the Doppler RCS threshold.

Accordingly, since the posture of the living body is estimated when the living body is determined to be still when the Doppler RCS value is less than or equal to the Doppler RCS threshold, it is possible to rapidly and highly precisely estimate the posture of the living body. Moreover, since the action of the living body is estimated when the living body is determined to be active when the Doppler RCS value is greater than the Doppler RCS threshold, it is possible to rapidly estimate and highly precisely the action of the living body.

The state estimation unit may be configured to determine the action of the living body to be traveling when the travel determination unit determines that the living body is traveling.

Accordingly, it is possible to precisely estimate that the living body is traveling.

At least three of the N transmission antenna elements may be arranged in different positions in vertical and horizontal directions, at least three of the M reception antenna elements may be arranged in different positions in the vertical and horizontal directions, the memory may store information indicating correspondences between (i) pairs of vertical positions of the living body in the vertical direction relative to the sensor and Doppler RCS values, (ii) and postures of the living body, the position estimation unit may be configured to estimate, as the position of the living body, a three-dimensional position including a vertical position of the living body in the vertical direction relative to the sensor, and the state estimation unit may be configured to estimate the posture of the living body, by using the Doppler RCS value calculated, the vertical position estimated, and the information that indicates the correspondences and is stored in the memory.

Accordingly, it is possible to rapidly and highly precisely estimate the position of the living body and the posture of the living body at that position.

At least three of the N transmission antenna elements may be arranged in different positions in vertical and horizontal directions, at least three of the M reception antenna elements may be arranged in different positions in the vertical and horizontal directions, the memory may store information indicating correspondences between (i) pairs of vertical positions of the living body in the vertical direction relative to the sensor and Doppler RCS values, (ii) and postures of the living body, the position estimation unit may be configured to estimate, as the position of the living body, a three-dimensional position including a vertical position of the living body in the vertical direction relative to the sensor, and the state estimation unit may be configured to estimate a posture probability as the posture of the living body, by using the Doppler RCS value calculated, the vertical position estimated, and the information that indicates the correspondences and is stored in the memory, the posture probability being a probability of one or more predetermined postures assumable by the living body.

Accordingly, it is possible to rapidly and highly precisely estimate the position of the living body and the posture probability, which is the probability of each of one or more postures assumable by the living body, at that position.

The state estimation unit may be configured to, after successively estimating the posture of the living body by using the Doppler RCS value successively calculated and the position of the living body successively estimated, store the postures of the living body successively estimated into the memory, and the Doppler RCS threshold setting unit may be configured to set the Doppler RCS threshold in accordance with the posture of the living body estimated most recently among the postures of the living body stored in the memory.

Accordingly, it is possible to set the Doppler RCS threshold to a value appropriate for the posture of the living body.

The state estimation unit may be configured to: after successively estimating the posture of the living body by using the Doppler RCS value successively calculated and the position of the living body successively estimated, store the postures of the living body successively estimated into the memory; before estimating a subsequent posture of the living body, wait until the Doppler RCS value successively calculated becomes less than or equal to the Doppler RCS threshold, and estimate a next posture to be the posture of the living body estimated from the N reception signals at a timing that the Doppler RCS value becomes less than or equal to the Doppler RCS threshold; and estimate the action of the living body by using a previous posture and the next posture estimated, the previous posture being the posture of the living body that was immediately previously estimated and is stored in the memory.

Accordingly, it is possible to rapidly and highly precisely estimate the action of the living body.

The state estimation unit may be configured to: after successively estimating the posture of the living body by using the Doppler RCS value successively calculated and the position of the living body successively estimated, store the postures of the living body successively estimated into the memory; wait until the Doppler RCS value successively calculated becomes less than or equal to the Doppler RCS threshold; estimate, at a timing that the Doppler RCS value becomes less than or equal to the Doppler RCS threshold, one or more next actions of the living body by using a previous posture, the previous posture being the posture of the living body that was immediately previously estimated and is stored in the memory; and estimate the action of the living body by identifying one action from among the one or more next actions estimated, by using the Doppler RCS value successively calculated and the position of the living body successively estimated.

Accordingly; it is possible to rapidly and highly precisely estimate the action of the living body.

The state estimation unit may be configured to: after successively estimating the posture of the living body by using the Doppler RCS value successively calculated and the position of the living body successively estimated, store the postures of the living body successively estimated into the memory; wait until the Doppler RCS value successively calculated becomes less than or equal to the Doppler RCS threshold; estimate, at a timing that the Doppler RCS value becomes less than or equal to the Doppler RCS threshold, one or more next actions of the living body by using a previous posture, the previous posture being the posture of the living body that was immediately previously estimated and is stored in the memory; and estimate, as the action of the living body, an action probability, by using the Doppler RCS value successively calculated and the position of the living body successively estimated, the action probability being a probability of each of the one or more next actions estimated.

Accordingly, it is possible to rapidly and highly precisely estimate the action probability, which is the probability of one or more next actions.

Accordingly, it is possible to rapidly and highly precisely estimate the traveling of the living body, and/or the posture and/or action of the living body at the position of the living body.

The presence determination unit may be configured to estimate a total number of the living bodies present in the predetermined range, and determine that the living body is not present in the predetermined range when the total number of the living bodies is estimated to be zero, and determine that the living body is present in the predetermined range when the total number of the living bodies is estimated to be one or more.

Accordingly, it is possible to determine whether a living body is present in the predetermined range or not, by using the estimated number of living bodies present in the predetermined range. This makes it possible to simultaneously estimate the state of the living body and the number of living bodies.

An estimating device according to one aspect of the present disclosure includes circuitry and memory. The circuitry includes: an obtaining unit configured to obtain N reception signals received in a predetermined period by M reception antenna elements, from a receiver including the M reception antenna elements that respectively receive the N reception signals including one or more reflected signals, the one or more reflected signals being one or more of N transmission signals that is reflected or scattered by a living body, the N transmission signals being transmitted by a transmission signal generator including N transmission antenna elements that respectively transmit the N transmission signals to a predetermined range in which the living body is possibly present, where M is a natural number greater than or equal to 3, and N is a natural number greater than or equal to 3; a first matrix calculation unit configured to calculate, for each of N×M possible antenna element combinations of one of the N transmission antenna elements and one of the M reception antenna elements, a complex transfer function indicating a propagation characteristic between the transmission antenna element and the reception antenna element in the combination to obtain N×M complex transfer functions, from the N reception signals obtained, to successively calculate an N×M first matrix whose components are the N×M complex transfer functions calculated; a second matrix extraction unit configured to successively extract a second matrix corresponding to components affected by vital activity including at least any one of a respiration, a heartbeat, and a body motion of the living body, by successively extracting a matrix corresponding to a predetermined frequency range in the N×M first matrix successively calculated by the first matrix calculation unit; a presence determination unit configured to determine whether a living body is present in the predetermined range by using a predetermined method; a position estimation unit configured to, after the presence determination unit determines that a living body is present in the predetermined range, successively estimate a position of the living body relative to the transmission signal generator and the receiver, by using the second matrix successively extracted by the second matrix extraction unit; a Doppler radar cross section (RCS) calculation unit configured to (i) successively calculate a first distance and a second distance based on the position of the living body successively estimated by the position estimation unit, a position of the transmission signal generator, and a position of the receiver, the first distance indicating a distance between the living body and the transmission signal generator, and the second distance indicating a distance between the living body and the receiver, and (ii) successively calculate a Doppler RCS value for the living body, by using the first distance and the second distance calculated; a travel determination unit configured to store the position successively estimated into the memory a predetermined number of times, sequentially in order of estimation, and based on the positions of the living body stored the predetermined number of times into the memory, determine that the living body is traveling when a positional displacement of the living body is greater than or equal to a predetermined value, and determine that the living body is not traveling when the positional displacement is less than the predetermined value; a Doppler RCS threshold setting unit configured to set a Doppler RCS threshold by using a predetermined method; a Doppler RCS threshold determination unit configured to determine whether or not the Doppler RCS value calculated is less than or equal to the Doppler RCS threshold set, by comparing the Doppler RCS value and the Doppler RCS threshold; and a state estimation unit configured to selectively perform one of estimation of a posture of the living body and estimation of an action of the living body, in accordance with at least one of a determination result according to the travel determination unit and a determination result according to the Doppler RCS threshold determination unit.

Accordingly, the state of a living body, which is any one of the traveling of a living body, the posture of a living body, and the action of a living body, can be rapidly and highly precisely estimated.

Note that the present disclosure can be implemented not only as a sensor, but also as an integrated circuit including the processing units included in such a sensor, a method including steps of processes performed by the processing units included in the sensor, a computer program that causes a computer to execute the steps, and as information, data, or signal indicating such a computer program. The program, information, data, and signal may be distributed via a recording medium such as a CD-ROM, or a communication medium, such as the internet.

Hereinafter, exemplary embodiments of the present disclosure will be described in detail with reference to the drawings. Note that each of the exemplary embodiments described hereinafter illustrate a specific example of the present disclosure. The numerical values, shapes, materials, components, the arrangement and connection of the components, steps, the processing order of the steps, etc., shown in the following exemplary embodiments are mere examples, and are therefore not intended to limit the present disclosure. Furthermore, among the components in the following exemplary embodiments, those not recited in any one of the independent claims defining the broadest concept of the present disclosure are described as optional components making up a more preferable form. It should be noted that in the specification and the drawings, components having substantially the same functional configuration are given the same numerical sign in order to omit overlapping descriptions.

Embodiment 1

FIG. 1 is a block diagram illustrating one example of a configuration of a sensor according to Embodiment 1.

As illustrated in FIG. 1, sensor 10 includes transmission signal generator 20, receiver 30, and estimating device 100. Estimating device 100 includes circuitry 40 and memory 41. Sensor 10 emits microwaves via transmission signal generator 20 toward living body 50, such as a person, and receives, via receiver 30, reflected waves reflected or scattered by living body 50.

Transmission signal generator 20 includes N (N is a natural number greater than or equal to 3) transmission antenna elements 21. Transmission signal generator 20 includes a rectangular array antenna of N ($N=N_x \times N_z$) transmission antenna elements 21 whereby $N_x$ elements are arranged in the horizontal direction (x direction) and $N_z$ elements are arranged in the vertical direction (z direction). In other words, at least three of the N transmission antenna elements 21 are arranged in different positions in the vertical and horizontal directions.

Receiver 30 includes M (M is a natural number greater than or equal to 3) reception antenna elements 31. Receiver 30 includes a rectangular array antenna of M ($M=M_x \times M_z$) reception antenna elements 31 whereby $M_x$ elements are arranged in the horizontal direction (x direction) and $M_z$ elements are arranged in the vertical direction (z direction). In other words, at least three of the M reception antenna elements 31 are arranged in different positions in the vertical and horizontal directions.

Here, $\varphi T$ is the angle formed by a first reference direction, which is an arbitrarily set direction on a horizontal plane, relative to transmission signal generator 20, and a first living body direction, which is the direction toward living body 50 from transmission signal generator 20. Moreover, $\varphi_T$ is an elevation angle of living body 50, which is the angle formed by the vertical direction and the first living body direction. Moreover, $\varphi_R$ is an elevation angle of living body 50, which is an angle formed by a second reference direction, which is an arbitrarily set direction on a horizontal plane, relative to receiver 30, and a second living body direction, which is the direction toward living body 50 from receiver 30. Moreover, $\varphi_R$ is the angle formed by the vertical direction and the second living body direction. When the central coordinates for the part of the living body 50 performing a vital activity are expressed as ($x_b$, $y_b$, $z_b$), the directions ($\theta_T$, $\theta_R$, $\varphi_T$, $\varphi_R$) and coordinates ($x_b$, $y_b$, $z_b$) are reciprocally transformable via the positional relationships between transmission signal generator 20, receiver 30, and living body 50.

Each of the N transmission antenna elements 21 transmits a transmission signal to a predetermined range in which a living body is possibly present. In other words, transmission signal generator 20 transmits N transmission signals to a predetermined range from N different positions. Note that a predetermined range in which a living body is possibly present is a detection range in which sensor 10 detects the presence of a living body.

Specifically, each of the N transmission antenna elements 21 emits microwaves, as the transmission signals, to living body 50, one example of which is a person. The N transmission antenna elements 21 may emit, as the transmission signals, signals on which modulation processing that differs per transmission antenna element 21 has been performed.

Moreover, each of the N transmission antenna elements 21 may successively switch between the transmission of modulated or unmodulated signals. Modulation processing may be performed by transmission signal generator 20. By making the transmission signals transmitted by each of the N transmission antenna elements 21 different, it is possible to identify which transmission antenna element 21 transmitted a given transmission signal received by receiver 30. Accordingly, transmission signal generator 20 may include circuitry for performing modulation processing.

Each of the M reception antenna elements 31 receives N reception signals including reflected signals, which are signals among the N transmission signals transmitted by the N transmission antenna elements 21 that have been reflected or scattered by living body 50. Receiver 30 frequency transforms the reception signals, which are microwaves, into low-frequency signals. Receiver 30 outputs, to circuitry 40, the low-frequency signals resulting from the frequency transform. In other words, receiver 30 may include circuitry for processing reception signals.

Circuitry 40 implements various types of processing that operates sensor 10. For example, circuitry 40 includes a processor that executes a control program, and a volatile storage area (a primary storage device) used as a work area for when executing the control program. The volatile storage area is, for example, random access memory (RAM). Note that circuitry 40 may include dedicated circuitry for performing various types of processing that operates sensor 10. In other words, circuitry 40 may be circuitry that performs software processing, and may be circuitry that performs hardware processing.

Memory 41 is, for example, non-volatile storage space (an auxiliary storage device), and is, for example, read only memory (ROM), flash memory, or a hard disk drive (HDD). For example, memory 41 stores information used in the various types of processing that operates sensor 10.

Next, the functional configuration of circuitry 40 will be described with reference to FIG. 2.

Figure 2:
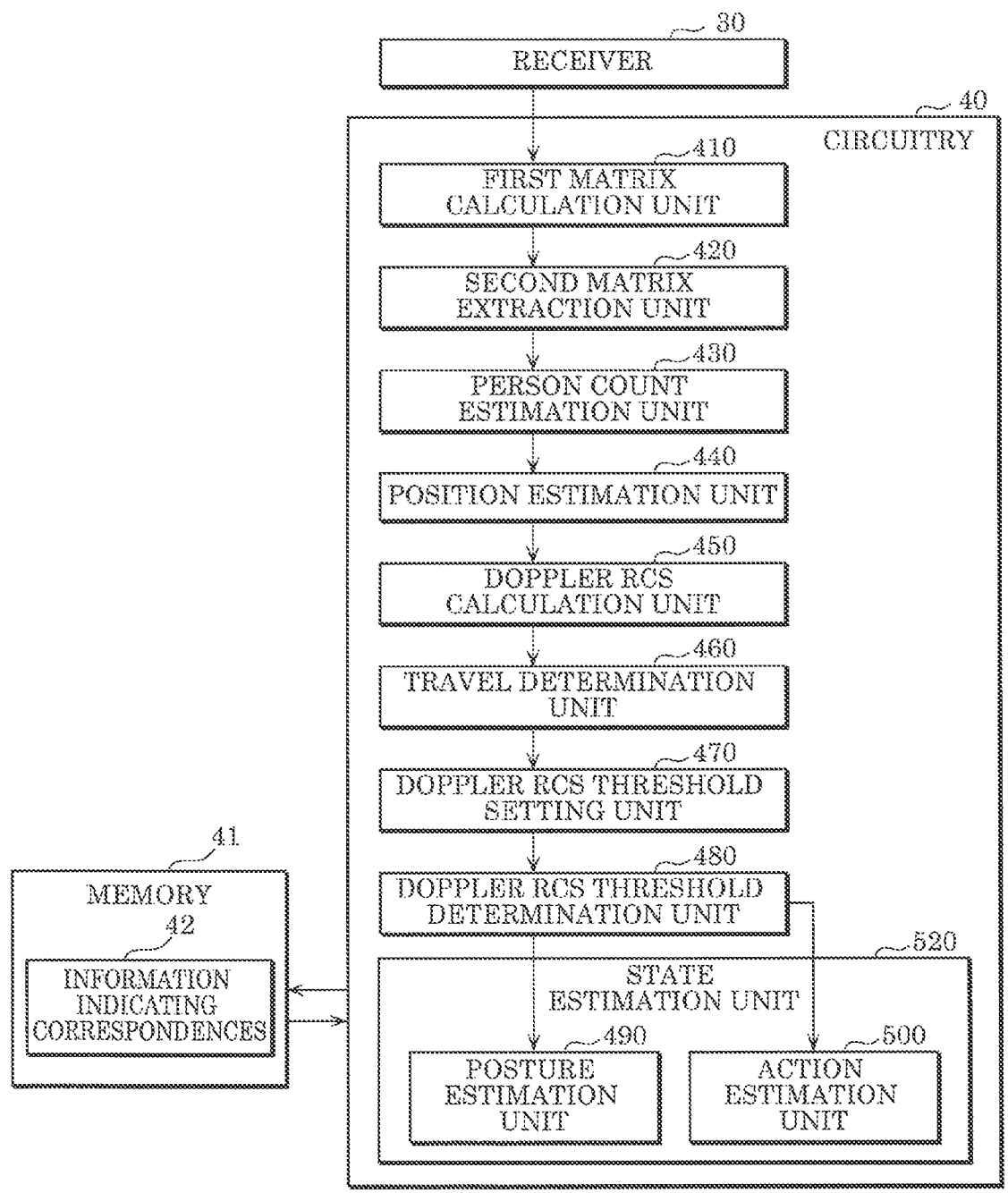
FIG. 2 is a block diagram illustrating a functional configuration implemented via circuitry and memory according to Embodiment 1.

FIG. 2 is a block diagram illustrating the functional configuration implemented via circuitry and memory according to Embodiment 1.

Circuitry 40 includes first matrix calculation unit 410, second matrix extraction unit 420, person count estimation unit 430, position estimation unit 440, Doppler RCS calculation unit 450, travel determination unit 460, Doppler RCS threshold setting unit 470, Doppler RCS threshold determination unit 480, and state estimation unit 520.

First matrix calculation unit 410 calculates a complex transfer function from reception signals transformed into low-frequency signals. A complex transfer function expresses a propagation loss and phase rotation between each transmission antenna element 21 and each reception antenna element 31. When the number of transmission antenna elements is N and the number of reception antenna elements is M, the complex transfer function is a complex matrix having M×N components. Henceforth, this complex matrix will be referred to as a complex transfer function matrix. The estimated complex transfer function matrix is output to second matrix extraction unit 420. In other words, first matrix calculation unit 410 successively calculates an N×M first matrix whose components are the complex transfer functions that indicate the propagation characteristics between each of the N transmission antenna elements 21 and each of the M reception antenna elements 31, from each of the plurality of reception signals received in a predetermined period by the M reception antenna elements 31. Note that propagation characteristics between each of the N transmission antenna elements 21 and each of the M reception antenna elements 31 are propagation characteristics between a transmission antenna element 21 and a reception antenna element 31 in each of N×M combinations obtained by combining, one-to-one, the N transmission antenna elements 21 and the M reception antenna elements 31.

Second matrix extraction unit 420 separates complex transfer function matrix components into those obtained from reception signals received by way of living body 50 and those obtained from reception signals received not by way of living body 50. A component received by way of living body 50 is a component exhibiting temporal variation resulting from living body activity. Accordingly, when, for example, anything other than living body 50 is still, components received by way of living body 50 can be extracted from components obtained by Fourier transforming complex transfer function matrix components in the temporal direction, by taking out components other than those that are direct current. Components received not by way of living body 50 can be extracted by, for example, taking out components exhibiting a deviance from an observation result of when living body 50 is not present in the predetermined range that exceeds a predetermined threshold. In this way, second matrix extraction unit 420 extracts complex transfer function matrix components obtained from reception signals including reflected signals received by way of living body 50, and calculates the extracted complex transfer function matrix components as the second matrix. In other words, by successively extracting second matrices corresponding to a predetermined frequency range in the first matrices successively calculated by first matrix calculation unit 410, second matrix extraction unit 420 successively extracts second matrices corresponding to components affected by vital activity including at least any one of the respiration, heartbeat, and body motion of a living body.

The predetermined frequency range is, for example, a range of frequencies originating from vital activity including at least one of the above-described respiration, heartbeat, and body motion of a living body. The predetermined frequency range is, for example, from 0.1 Hz to 3 Hz, inclusive. Second matrix extraction unit 420 can extract living body components affected by vital activity from a part of living body 50 affected by the movement of the heart, lungs, diaphragm, and intestines, or vital activity from, for example the hands or feet, by extracting the second matrix corresponding to the above-described predetermined frequency range. Note that a part of living body 50 affected by the movement of the heart, lungs, diaphragm, and intestines is, for example, a person's solar plexus.

Here, the second matrix extracted by second matrix extraction unit 420 is a matrix having N×M components, and is extracted from complex transfer functions obtained from reception signals observed in receiver 30 in a predetermined period. Accordingly, the second matrix includes frequency response information or time response information. Note that the predetermined period is approximately half of a cycle of at least one of a respiration, heartbeat, or body motion of the living body.

The second matrix calculated by second matrix extraction unit 420 is output to person count estimation unit 430. Person count estimation unit 430 may perform person count estimation by using eigenvalues or eigenvectors obtained by using the first matrix calculated by first matrix calculation unit 410 or the second matrix extracted by second matrix extraction unit 420. Person count estimation unit 430 is one example of the presence determination unit that determines whether a living body is present in the predetermined range or not. Person count estimation unit 430 may determine that no living body is present in the predetermined range when the number of living bodies estimated to be present in the predetermined range is zero, and may determine there to be a living body present in the predetermined range when the number of living bodies estimated to be present in the predetermined range is one or more.

After person count estimation unit 430 determines that a living body is present in the predetermined range, position estimation unit 440 estimates the position of living body 50 relative to sensor 10, by using the second matrices successively extracted by second matrix extraction unit 420. Position estimation unit 440 estimates both the departure angle $\theta_T$ from transmission signal generator 20 and the arrival angle $\theta_R$ to receiver 30, and estimates the position of living body 50 by triangulation using the estimated departure angle $\theta_T$ and arrival angle $\theta_R$. This estimated position of living body 50 is a three-dimensional position including a vertical position, which is a position in the vertical direction in which the living body is present relative to sensor 10. The positions of living body 50 successively estimated by position estimation unit 440 may be stored in memory 41.

Doppler RCS calculation unit 450 successively calculates a Doppler scattered cross section (Doppler radar cross section (RCS)) value, by using the successively extracted second matrices and the successively estimated positions. More specifically, in order to calculate the Doppler RCS values, based on the positions successively estimated by position estimation unit 440, the position of transmission signal generator 20, and the position of receiver 30, Doppler RCS calculation unit 450 successively calculates distance RT indicating a first distance, which is a distance between a successively estimated position of living body 50 and transmission signal generator 20, and distance RR indicating a second distance, which is a distance between a successively estimated position of living body 50 and receiver 30. Doppler RCS calculation unit 450 calculates propagation distances from the successively calculated distances RT and distances RR, and successively calculates Doppler RCS values by using the output propagation distances and intensities of the living body components. Note that the position of transmission signal generator 20 and the position of receiver 30 may be stored in advance in memory 41.

Travel determination unit 460 stores, in memory 41, the positions of living body 50 successively estimated by position estimation unit 440, in the order that they are estimated. Travel determination unit 460 determines whether living body 50 is traveling, by using the positions of living body 50 stored a predetermined times (for example, L times) in memory 41. Travel determination unit 460 references L positions of living body 50 estimated in a predetermined period, such as the past five seconds, from among the plurality of stored positions of living body 50, calculates, in order, the distance between the most recent position and the first prior position, the distance between the first prior position and the second prior position, . . . , and the distance between the L−1-th prior position and the L-th prior position, and calculates the total sum of all of the calculated L−1 distances as the travel distance. In other words, travel determination unit 460 calculates the travel distance by cumulating distances between two temporally adjacent positions, by using all of the L positions sampled in the predetermined period. Note that the travel distance can also be referred to as a displacement of the position of living body 50.

For example, when the calculated travel distance is greater than or equal to a predetermined value, such as one meter, travel determination unit 460 determines that living body 50 has been traveling in a predetermined period, i.e., the last five seconds. When the calculated travel distance is under a predetermined value, travel determination unit 460 determines that living body 50 is not traveling in the predetermined period.

Note that travel determination unit 460 is exemplified as calculating a travel distance using all of the plurality of positions sampled in the predetermined period, but travel determination unit 460 is not limited to this example. For example, travel determination unit 460 may calculate the distance between the most recent position and a position before the predetermined period as the travel distance, and may extract a plurality of points from among the L positions sampled during the predetermined period and cumulate the distance between two temporally adjacent positions from among the plurality of extracted positions to calculate the travel distance.

Doppler RCS threshold setting unit 470 sets the Doppler RCS threshold using a predetermined method. Specifically, Doppler RCS threshold setting unit 470 sets the Doppler RCS threshold in accordance with the most recently estimated state of the living body estimated from among the states accumulated in memory 41.

The Doppler RCS threshold may be set differently for different states of the living body, and, for example as illustrated in FIG. 3, may multiply the average of 10 Doppler RCS values for a given previous posture calculated the previous 10 times, by a fixed rate, such as 1.5 (150%), and set the obtained value as the threshold. Note that FIG. 3 illustrates a table of set values of the Doppler RCS threshold in the sensor according to Embodiment 1.

Here, since the optimal rate to be multiplied by the threshold differs depending on the previous posture for the application, the rate may be determined for each previous posture for the application as necessary. For example, the rate for calculating the Doppler RCS threshold may be set to 1.1 (110%) when the previous posture is the recumbent position and the next posture is rolling over, like in the bottom row of the table in FIG. 3, and the rate for calculating the Doppler RCS threshold may be set to 1.2 (120%) for other cases. This is due to the Doppler RCS value calculated when the previous posture is the recumbent position and the next posture is rolling over, like in the bottom row of the table in FIG. 3, being lower than the Doppler RCS value calculated for other postures.

Doppler RCS threshold determination unit 480 compares the Doppler RCS value calculated in Doppler RCS calculation unit 450 with the Doppler RCS threshold set in Doppler RCS threshold setting unit 470, and determines whether the Doppler RCS value is less than or equal to the Doppler RCS threshold or not.

State estimation unit 520 estimates the state of living body, which is one of a posture of living body 50 and an action of living body 50, in accordance with at least one of the determination result according to travel determination unit 460 and the determination result according to Doppler RCS threshold determination unit 480. State estimation unit 520 includes posture estimation unit 490 and action estimation unit 500.

When travel determination unit 460 determines that living body 50 is not traveling and the Doppler RCS threshold determination unit 480 determines that the Doppler RCS value is less than or equal to the Doppler RCS threshold, posture estimation unit 490 estimates the posture of living body 50. In such cases, since posture estimation unit 490 can estimate that the position of living body 50 has hardly changed and thus the posture of living body 50 is still, i.e., not moving, posture estimation unit 490 can estimate that the posture of living body 50 is one of being still in a single position. Posture estimation unit 490 uses, for example, the method described in Japanese Unexamined Patent Application Publication No. 2018-8021 to estimate the posture of living body 50 by using the Doppler RCS value calculated by Doppler RCS calculation unit 450 and the vertical position of living body 50, and information 42, which is stored in memory 41 and indicates correspondences between (i) pairs of Doppler RCS values and vertical positions of living body 50 and (ii) postures of living body 50.

Figure 4:
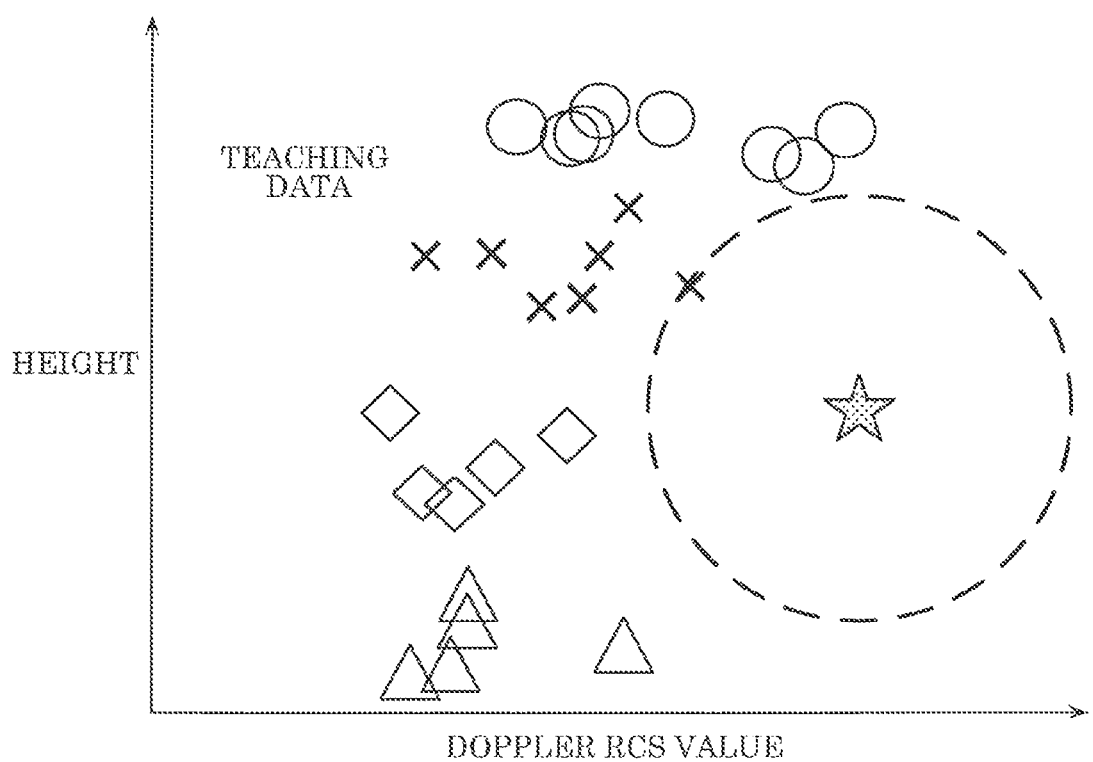
FIG. 4 illustrates one example of posture estimation performed by a posture estimation unit according to Embodiment 1.

Note that in Japanese Unexamined Patent Application Publication No. 2018-8021, posture is estimated based on a region of the vertical position stored in memory 41 and the Doppler RCS value, but as illustrated in FIG. 4, when K=1 in the K-nearest neighbors algorithm, the posture of living body 50 may be estimated to be the posture of the living body associated with training data that is the closest to the vertical position and the Doppler RCS value of the living body. Note that FIG. 4 illustrates one example of posture estimation performed by the posture estimation unit according to Embodiment 1.

When the Doppler RCS value is determined to be greater than the Doppler RCS threshold by Doppler RCS threshold determination unit 480, action estimation unit 500 estimates the action of living body 50. In such cases, since action estimation unit 500 can estimate that the posture of living body 50 is active, i.e., moving, action estimation unit 500 can estimate the action of living body 50. Action estimation unit 500 references a calculated Doppler RCS value and an estimated vertical position of living body 50, which are stored in memory 41, calculates a correlation between (i) a transition vector of the Doppler RCS value and the vertical position of living body 50 and (ii) a training vector stored in advance to estimate the action of living body 50.

Figure 5:
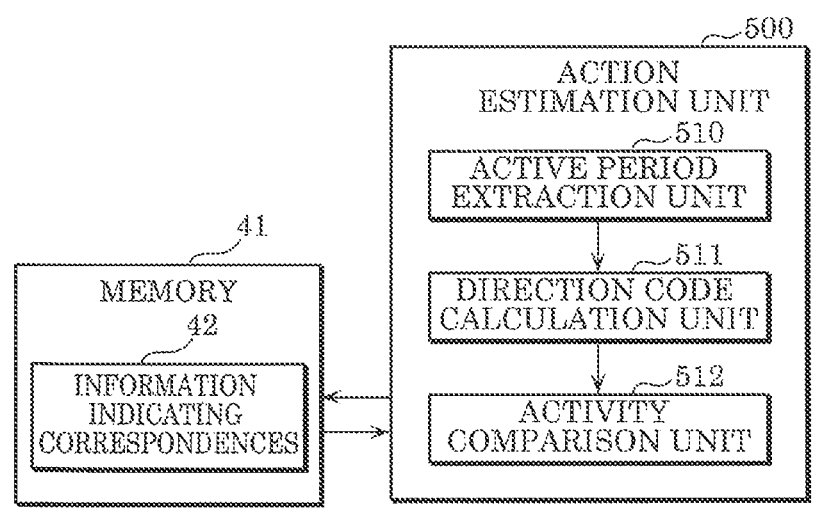
FIG. 5 is a block diagram illustrating one example of a configuration of an action estimation unit according to Embodiment 1.

FIG. 5 is a block diagram illustrating one example of a configuration of action estimation unit 500 according to Embodiment 1.

Action estimation unit 500 estimates the action of living body 50 by using (i) time series data indicating a change over time in the position estimated by position estimation unit 440 and the Doppler RCS value calculated by Doppler RCS calculation unit 450, and (ii) information 42 that indicates correspondences and is stored in advance in memory 41. Action estimation unit 500 includes active period extraction unit 510, direction code calculation unit 511, and activity comparison unit 512.

Figure 6:
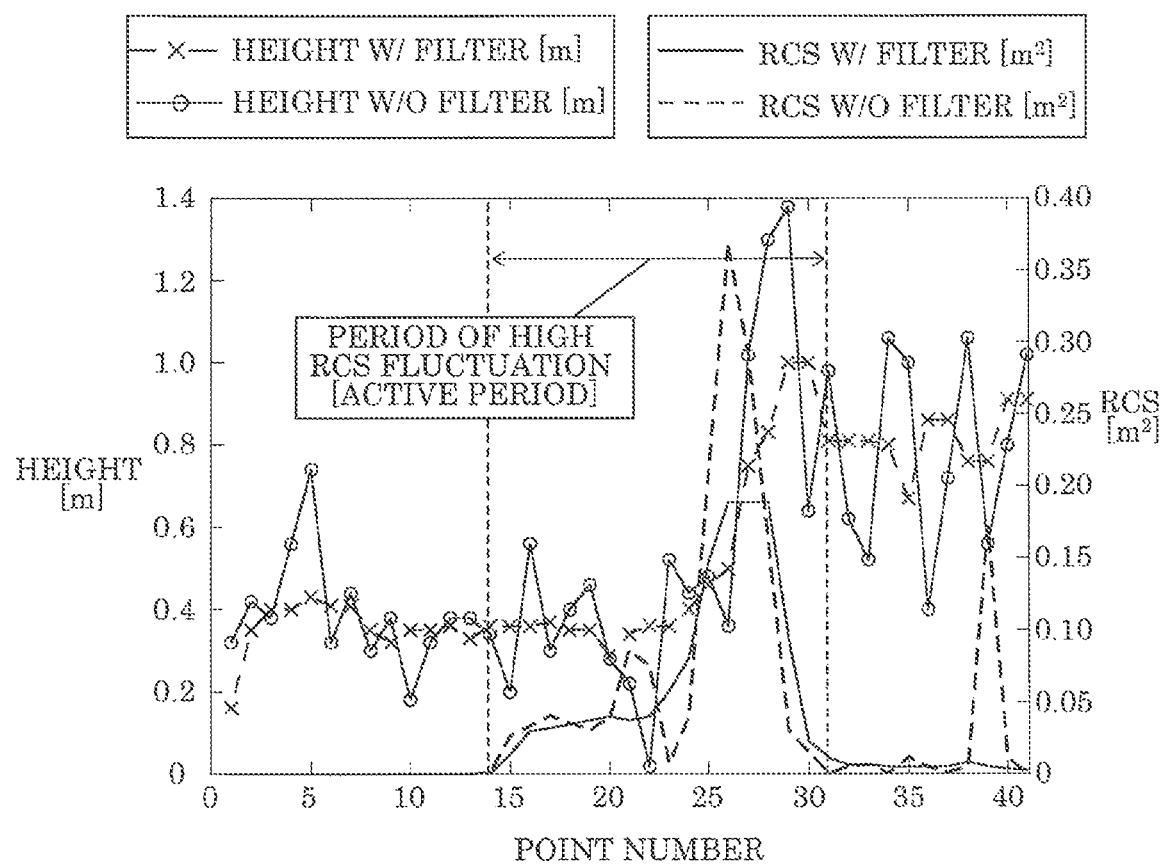
FIG. 6 describes an example in which the active period is extracted from time series data of the height or the Doppler RCS value.

As illustrated in FIG. 6, active period extraction unit 510 extracts, as an active period, which is a period during which the user is performing an action, a period in which the range of temporal changes in the position of living body 50 estimated by position estimation unit 440 or the Doppler RCS value calculated by Doppler RCS calculation unit 450 is greater than a predetermined value. Note that FIG. 6 is for describing an example in which the active period is extracted from time series data of the height or the Doppler RCS value.

For example, when extracting the active period by using the height, which is the vertical position, or the Doppler RCS value, in order to avoid influence from impulse noise, active period extraction unit 510 may use, for example, a median filter, FIR filter, or average value on the obtained time series data of the positions or Doppler RCS values of living body 50 to remove noise components in the height values and Doppler RCS values, and extract, as the active period of the living body, the segment of the filtered height information exhibiting changes or the Doppler RCS segment exhibiting changes. In other words, to extract the active period, active period extraction unit 510 may use time series data obtained by using a predetermined filter to remove impulse noise components from a plurality of vertical positions obtained in a time series or a plurality of Doppler RCS values obtained in a time series.

Note that from the perspective of reducing the amount of calculations made, active period extraction unit 510 is effective when the period to be estimated is to be limited, but active period extraction unit 510 need not necessarily be provided. In other words, when posture estimation is performed for all segments, active period extraction unit 510 may be omitted, and posture estimation may be performed for all segments.

Figure 7:
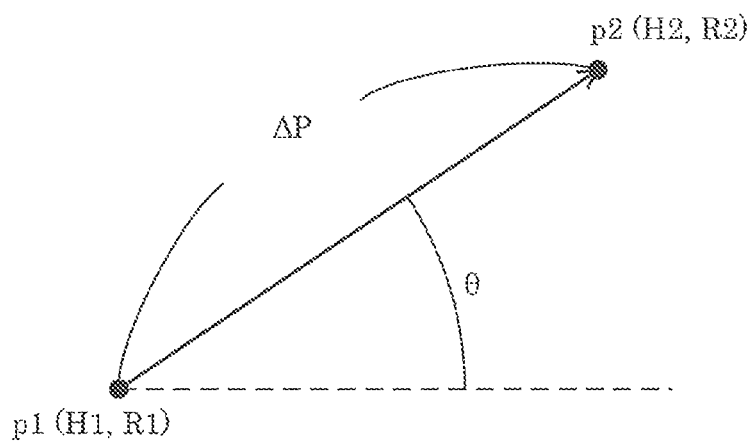
FIG. 7 illustrates processes for directional vector transform.

Direction code calculation unit 511 uses a predetermined method to transform, into a directional vector, a temporal change in a vertical position (height) obtained from estimated positions of living body 50, and a temporal change in calculated Doppler RCS values, in the active period extracted by active period extraction unit 510. More specifically, as illustrated in FIG. 7, direction code calculation unit 511 two-dimensionally plots heights and Doppler RCS values, and in the trajectory in the temporal change, calculates trajectory distance $\Delta P$ and trajectory direction $\theta$. For example, direction code calculation unit 511 transforms the temporal change into a directional vector by calculating, in a trajectory from first coordinates p1 (H1, R1) indicated by height H1 and Doppler RCS value R1 at a first timing to second coordinates p2 (H2, R2) indicated by height H2 and Doppler RCS value R2 at a second timing after the first timing, distance $\Delta P$ between first coordinates p1 (H1, R1) and second coordinates p2 (H2, R2) and direction $\theta$ from first coordinates p1 (H1, R1) to second coordinates p2 (H2, R2). FIG. 7 illustrates processes for the directional vector transform.

Figure 8:
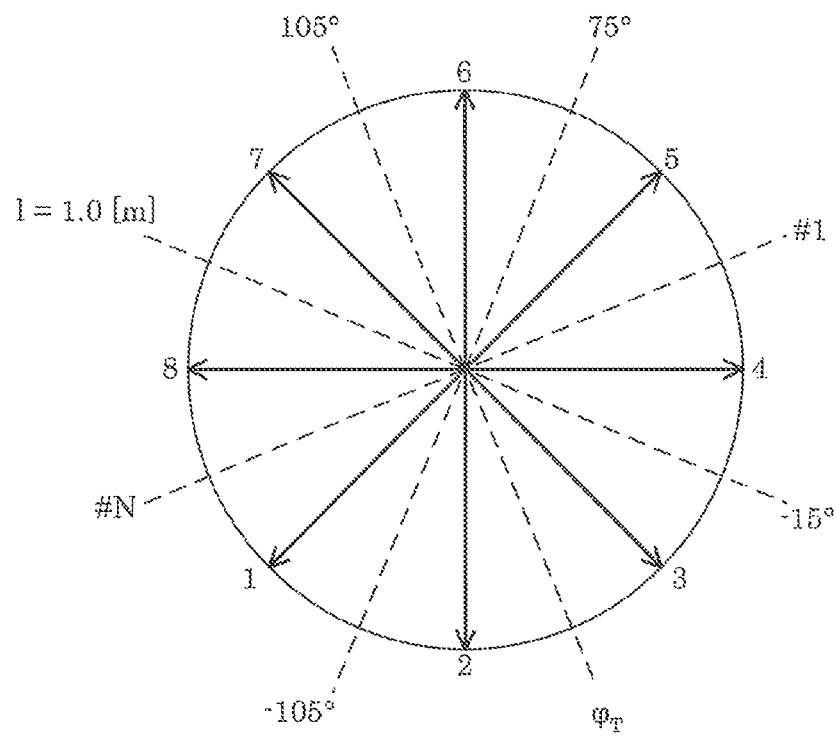
FIG. 8 illustrates one example of a direction code table.

Next, direction code calculation unit 511 calculates a direction code by normalizing the transformed directional vector. More specifically, direction code calculation unit 511 calculates a direction code by referencing the direction code table illustrated in FIG. 8. For example, direction code calculation unit 511 identifies the direction code to which direction $\theta$ is closest from among the direction codes indicated by 1 through 8. FIG. 8 illustrates one example of a direction code table.

Figure 9:
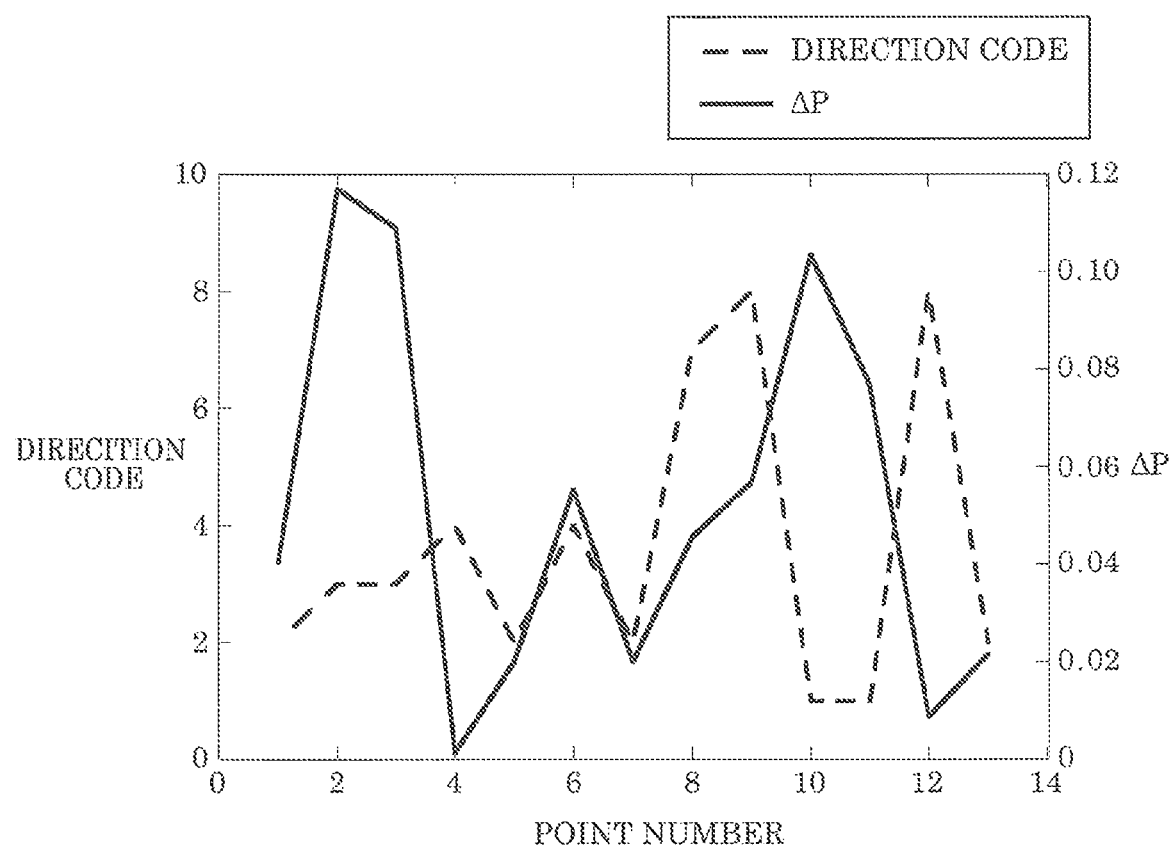
FIG. 9 illustrates one example of time series data of the calculated direction code and distance.

By calculating the above-described direction code and distance $\Delta P$, direction code calculation unit 511 obtains time series data for the direction code, such as the data illustrated in FIG. 9. FIG. 9 illustrates one example of time series data of the calculated direction code and distance. Note that at this time, direction code calculation unit 511 may normalize the direction code in order to avoid influence from individual variation.

Activity comparison unit 512 estimates the action of living body 50 by identifying the action associated with the time series data of the direction code calculated by direction code calculation unit 511 in information 42 that indicates the correspondences and is stored in memory, by comparing the time series data and information 42 indicating the correspondences.

Note that information 42 that indicates the correspondences and is stored in memory 41 is information indicating correspondences between (i) a plurality of model codes indicating temporal changes in vertical position, which is the position of living body 50 in the vertical direction relative to sensor 10, and Doppler RCS values, and (ii) actions of living body 50. Moreover, the actions of living body 50 associated in information 42 indicating the correspondences include falling down, sitting in a chair, sitting on the ground, standing from a chair, standing from the ground, jumping, and a directional change. In other words, action estimation unit 500 uses temporal changes in the position estimated by position estimation unit 440 and the Doppler RCS value calculated by Doppler RCS calculation unit 450, and information 42 indicating correspondences stored in advance in memory 41, to estimate whether living body 50 has made any of the actions of falling down, sitting in a chair, sitting on the ground, standing from a chair, standing from the ground, jumping, and a directional change. Note that a model code is expressed as time series data, such as in FIG. 10.

Note that when travel determination unit 460 determines that living body 50 is traveling, action estimation unit 500 may estimate that the action of living body 50 is "traveling". In such cases, when the posture of living body 50 is estimated to be "standing" immediately before determining that the living body 50 is traveling, action estimation unit 500 may estimate that the action of living body 50 is "walking". Moreover, when the posture of living body 50 is estimated to be "sitting" immediately before determining that the living body 50 is traveling, action estimation unit 500 may estimate that the action of living body 50 is "travel via wheelchair". Moreover, when the posture of living body 50 is estimated to be "recumbent" immediately before determining that the living body 50 is traveling, action estimation unit 500 may estimate that the action of living body 50 is "rolling over" or "crawling".

Note that in circuitry 40, the processes performed by each of the units 410 through 500 described above may be repeated a plurality of times to obtain time series data. For example, circuitry 40 obtains time series data including a time series of positions and a time series of Doppler RCS values by repeatedly performing processes in a predetermined sampling cycle.

Next, details regarding the operational principle of sensor 10 according to Embodiment 1 will be described with reference to mathematical expressions. Note that here, a method of extracting living body components using Fourier transform will be described. The processes described here are performed by circuitry 40. The complex transfer function matrix between transmission signal generator 20 and receiver 30 is defined as follows.

[MATH. 1]

$$H(t) = \begin{pmatrix} h_{11}(t) & \cdots & h_{1N}(t) \\ \vdots & \ddots & \vdots \\ h_{M1}(t) & \cdots & h_{MN}(t) \end{pmatrix} \quad \text{(Expression 1)}$$

Here, t represents time. When each component in Expression 1 is Fourier transformed, the following frequency response matrix is obtained.

[MATH. 2]

$$G(f) = \begin{pmatrix} g_{11}(f) & \cdots & g_{1N}(f) \\ \vdots & \ddots & \vdots \\ g_{M1}(f) & \cdots & g_{MN}(f) \end{pmatrix} \quad \text{(Expression 2)}$$

Here, f represents frequency, and each component in the frequency response matrix is a complex number. This frequency response matrix includes both propagation components received by way of living body 50, and propagation components received by way of something other than living body 50. When things other than the living body are conceivably still, the current component of frequency response matrix, i.e., G(0), conceivably includes mainly propagation components from something other than the living body. This is conceivably because components received by way of a living body are included in frequencies other than f=0 since a Doppler shift occurs due to vital activity including at least any one of the respiration, heartbeat, and body motion of the living body. Furthermore, taking into consideration the frequencies of the respiration or heartbeat of the living body and the harmonics thereof, components originating from a living body are plentiful in the range of f<3 [Hz]. Accordingly, for example, if G(f) of the predetermined frequency range of 0 [Hz]<f<3 [Hz] is retrieved, it is possible to effectively extract living body components.

Next, a living body position estimating method using living body components G(f) will be described. The living body components matrix G(f) is rearranged into vector format as follows.

[MATH. 3]

$$g(f)=[g_{11}(t), \ldots, g_{M1}(t), g_{12}(t), \ldots, g_{N2}(t), \ldots, g_{1M}(t), \ldots, g_{NM}(t)]^T \quad \text{(Expression 3)}$$

This is defined as a living body component vector. Here, $\{\cdot\}^T$ represents transposition. The correlation matrix is calculated from living body component vector g(f) as follows.

[MATH. 4]

$$R=\overline{g(f)g(f)^H} \quad \text{(Expression 4)}$$

Here, $\{\cdot\}^H$ represents complex conjugate transposition. Furthermore, R is averaged between 0 [Hz]<f<3 [Hz]. This averaging is known to improve position estimation precision, to be described later. Next, eigenvalue decomposition is performed on the calculated correlation matrix R to calculate eigenvectors U of the correlation matrix, and complex conjugate transposition vector $U^H$ thereof.

[MATH. 5]

$$R=UDU^H \quad \text{(Expression 5)}$$

Note that the eigenvectors in Expression 5 is represented via Expression 6 below.

[MATH. 6]

$$U=[u_1, \ldots, u_{MN}] \quad \text{(Expression 6)}$$

Here, $u_i$ represents the i-th column of the eigenvectors, and the number of elements is NM. D is a diagonal matrix in which the diagonal elements are eigenvalues, and is represented as follows.

[MATH. 7]

$$D=\text{diag}[\lambda_1, \ldots, \lambda_{MN}] \quad \text{(Expression 7)}$$

Here, diag[·] represents a diagonal matrix having a diagonal containing the elements in the [·]. Circuitry 40 estimates the position of living body 50, which is the detection target, by using the above-described information. Here, as one example, a position estimating method based on the MUSIC method will be described. In the MUSIC method, a direction and a position are estimated by using a directional vector known as a steering vector and the eigenvectors illustrated in Expression 6. The living body component vector illustrated in Expression 3 is obtained by modifying the original M×N matrix. In order to estimate the position of living body 50, the corresponding steering vector needs to be defined. The steering vector indicating the (θT, φT) direction from transmission signal generator 20 toward living body 50 and the steering vector indicating the (θR, φR) direction from receiver 30 toward living body 50 are respectively represented as follows.

[MATH. 8]

$$a_T(\theta_T, \phi_T) = \begin{bmatrix} e^{-j\Phi_{T(1,1)}}, \ldots, e^{-j\Phi_{T(N_x,1)}}, \ldots, \\ e^{-j\Phi_{T(1,N_z)}}, \ldots, e^{-j\Phi_{T(N_x,N_z)}} \end{bmatrix}^T \quad \text{(Expression 8)}$$

[MATH. 9]

$$a_R(\theta_R, \phi_R) = \begin{bmatrix} e^{-j\Phi_{T(1,1)}}, \ldots, e^{-j\Phi_{T(N_x,1)}}, \ldots, \\ e^{-j\Phi_{T(1,M_z)}}, \ldots, e^{-j\Phi_{T(M_x,M_z)}} \end{bmatrix}^T \quad \text{(Expression 9)}$$

[MATH. 10]

$$\Phi_{T(i_x, i_z)} = \quad \text{(Expression 10)}$$
$$k\{d_{Tx}(i_x - 1)\sin\theta_T\cos\phi_T + d_{Tz}(i_z - 1)\cos\theta_T\} \begin{cases} 1 \le i_x \le N_x \\ 1 \le i_z \le N_z \end{cases}$$

[MATH. 11]

$$\Phi_{R(j_x, j_z)} = k\{d_{Rx}(j_x - 1)\sin\theta_R\cos\phi_R + d_{Rz}(j_z - 1)\cos\theta_R\} \quad \text{(Expression 11)}$$
$$\begin{cases} 1 \le j_x \le M_x \\ 1 \le j_z \le M_z \end{cases}$$

Here, k represents wavenumber, $d_{Tx}$ and $d_{Tz}$ represent intervals between transmission antenna elements 21 in the x and z directions, respectively, and $d_{Rx}$ and $d_{Rz}$ represent intervals between reception antenna elements 31 in the x and z directions, respectively. Note that in this embodiment, the intervals between elements are assumed to be linear antennas at regular intervals in the same direction.

For example, $d_{Tx}$ represents the interval between two transmission antenna elements 21 that are adjacent in the x direction among the plurality of transmission antenna elements 21. For example, $d_{Tz}$ represents the interval between two transmission antenna elements 21 that are adjacent in the z direction among the plurality of transmission antenna elements 21. For example, $d_{Rx}$ represents the interval between two reception antenna elements 31 that are adjacent in the x direction among the plurality of reception antenna elements 31. For example, $d_{Rz}$ represents the interval between two reception antenna elements 31 that are adjacent in the z direction among the plurality of reception antenna elements 31. The following shows the result of calculating the Kronecker product of the steering vectors for the above.

[MATH. 12]

$$a(\theta_T, \phi_T, \theta_R, \phi_R) = a_T(\theta_T, \phi_T) \otimes a_R(\theta_R, \phi_R) \quad \text{(Expression 12)}$$

Steering vector $a(\theta_T, \varphi_T, \theta_R, \varphi_R)$ is a vector having MN×1 elements, and is a function having the four variables of departure angles θT and φT and arrival angles θR and φR. Henceforth $a(\theta_T, \varphi_T, \theta_R, \varphi_R)$ is defined as a steering vector. When the number of living bodies present in the detection range is defined as L, the following evaluation function identifies the positions of the living bodies.

[MATH. 13]

$$P(\theta_T, \phi_T, \theta_R, \phi_R) = \frac{a^H(\theta_T, \phi_T, \theta_R, \phi_R)a(\theta_T, \phi_T, \theta_R, \phi_R)}{a^H(\theta_T, \phi_T, \theta_R, \phi_R)[u_{L+1}, \ldots, u_{MN}]} \quad \text{(Expression 13)}$$
$$[u_{L+1}, \ldots, u_{MN}]^H a(\theta_T, \phi_T, \theta_R, \phi_R)$$

Here, the evaluation function in Expression 11 is referred to as a MUSIC spectrum, and by searching for the maximum point in the combination ($\theta_T$, $\theta_R$) of directions from each of transmission signal generator 20 and receiver 30 to the detection target, it is possible to identify a three-dimensional position of living body 50 from the viewpoints of transmission signal generator 20 and receiver 30, including the vertical position, by using triangulation based on $\theta_T$ and $\theta_R$ corresponding to the maximum.

The Doppler RCS value is calculated by using Expression 12, and the posture of living body 50 is estimated based on the position and Doppler RCS value of living body 50. When the extracted frequency range described above is expressed as f1 to f2 (f1<f2), it is possible to calculate the following once a transmission coefficient of power is calculated from channel components reflected and observed from the living body.

[MATH. 14]

$$\rho_{ij} = \int_{f1}^{f2} |g_{ij}(f)|^2 df \quad \text{(Expression 14)}$$

Here, ρij represents the (i, j)-th element in the following matrix.

[MATH. 15]

$$\rho = \begin{bmatrix} \rho_{11} & \cdots & \rho_{1N} \\ \vdots & \ddots & \vdots \\ \rho_{M1} & \cdots & \rho_{MN} \end{bmatrix} \quad \text{(Expression 15)}$$

Power emitted from the j-th transmission antenna element 21 and reaching the i-th reception antenna element 31 by way of living body 50 is expressed as follows.

[MATH. 16]

$$P_{rij} = \frac{P_t G_t G_r \sigma_{ij} \lambda^2}{(4\pi)^3 R_1^2 R_2^2} \quad \text{(Expression 16)}$$

Here, Pt represents transmission power. Note that it is herein assumed that equal power is transmitted from all transmission antenna elements 21. Gt represents the actual gain of transmission signal generator 20, Gr represents the actual gain of receiver 30, R1 represents the distance from transmission signal generator 20 to living body 50, and R2 represents the distance from living body 50 to receiver 30. Distance R1 and distance R2 can be easily calculated from the position estimated using MATH. 13. Then, since the transmission coefficient of power defined by Expression 12 is expressed as ρij=Prij/Pt, the scattered cross section can be calculated using the following.

[MATH. 17]

$$\sigma_{ij} = \frac{P_{rij}(4\pi)^3 R_1^2 R_2^2}{P_t G_t G_r \lambda^2} \quad \text{(Expression 17)}$$

Note that the scattered cross section used herein is not the scattered cross section of the whole living body 50, but rather only a Doppler scattered cross section corresponding to components that fluctuate from the vital activity of living body 50, such as the respiration, heartbeat, and/or body motion of living body 50. Furthermore, all elements are averaged to calculate the average scattered cross section using the following.

[MATH. 18]

$$\bar{\sigma} = \frac{1}{MN} \sum_{i=1}^{M} \sum_{j=1}^{N} \sigma_{ij} \quad \text{(Expression 18)}$$

Hereinafter, the following shall be referred to as Doppler RCS.

[MATH. 19]

$$\bar{\sigma}$$

Note that, for example, when further separating the vital components and body motion components of a living body when taking measurements, it goes without saying that the frequency range in MATH. 14 may be adjusted accordingly before performing the processes.

Next, the action estimation method will be described.

With the method described above, by continuously estimating the Doppler RCS value σ and height z of living body 50 at different points in time, it is possible to observe the trajectory of the σ-z characteristic. Here, since there is virtually no change in the Doppler RCS value, when the living body is active when the living body is still, the flow of trajectory points exhibiting great changes in the Doppler RCS value can be extracted. Trajectory point displacement ΔPi, which is the distance between the i−1-th trajectory point and the i-th trajectory point, is defined in MATH. 20, and angle parameter αi, which is the angle between the i−1-th trajectory point and the i-th trajectory point, is defined in MATH. 21.

[MATH. 20]

$$\Delta P_i = \sqrt{(\sigma_i - \sigma_{i-1})^2 + (z_i - z_{i-1})^2} \quad \text{(Expression 19)}$$

[MATH. 21]

$$\alpha_i = \tan^{-1}\left(\frac{z_i - z_{i-1}}{\sigma_i - \sigma_{i-1}}\right) \quad \text{(Expression 20)}$$

Next, using the angle parameter value, the trajectory point displacement direction is assigned with a direction code. The assignment of direction codes to angles is achieved by dividing 360 degrees eight times, and assigning them with numbers 1 through 8. Here, the assignment of direction codes may be done such that code boundaries do not fall on the vertical and horizontal directions so that the codes do not frequently change when there is movement in the vertical and horizontal directions. Since the speed of an action performed by living body 50 may vary from living body to living body, in order to avoid misrecognition resulting from the same activity being performed at different speeds leading to a difference in the number of trajectory points, the direction codes may be normalized taking into account the differences in activity speed. For example, a normalized code column of K items is generated from the raw direction code column $c_j$ (j=1 to $j_{max}$), taking into consideration the proportion of the trajectory point displacement to the sum total of the trajectory point displacement. Here, $j_{max}$ is the number of trajectories, which changes depending on how long the operation lasts. Normalized code column $C_k$ (k=1, 2, . . . , K) is created as follows, from the i-th trajectory displacement ΔPi and the trajectory point displacement total sum $\Delta P_{sum}$.

1) When j=1, the normalized code column having the range of k that satisfies MATH. 22 has the code j=1 in the raw direction code column.

[MATH. 22]

$$1 \le k \le \frac{\Delta P_1}{\Delta P_{sum}} \times K \quad \text{(Expression 21)}$$

2) When j is in the range 2 to $j_{max}$, the normalized code column having the range of k that satisfies MATH. 23 each has the code in j. Note that $\Delta P_{sum}$ satisfies MATH. 24.

[MATH. 23]

$$\frac{\sum_{i=1}^{j-1} \Delta P_i}{\Delta P_{sum}} \times K < k \le \frac{\sum_{i=1}^{j} \Delta P_i}{\Delta P_{sum}} \times K \quad \text{(Expression 22)}$$

[MATH. 24]

$$\Delta P_{sum} = \sum_{i=1}^{j_{max}} \Delta P_i \quad \text{(Expression 23)}$$

The estimation of the action performed by living body 50 is done by comparing a normalized number sequence of K items created from trajectory point data (i.e., test data) with a model data number sequence of K items corresponding to the actions. The model data number sequence is model data obtained by measuring actions a plurality of times in advance, and selecting the most frequent direction codes at each item in the normalized code column obtained from the plurality of measurements of actions. Since the direction code is in the form of a ring, the greatest difference is 4. In order to calculate the actual difference with the direction code number, MATH. 25 is used. However, when $\delta C_i > 4$, MATH. 26 is used.

[MATH. 25]

$$\delta C_i = |C_{test,i} - C_{model,i}| \quad \text{(Expression 24)}$$

[MATH. 26]

$$\delta C_i = 8 - \delta C_i \quad \text{(Expression 25)}$$

Figure 10:
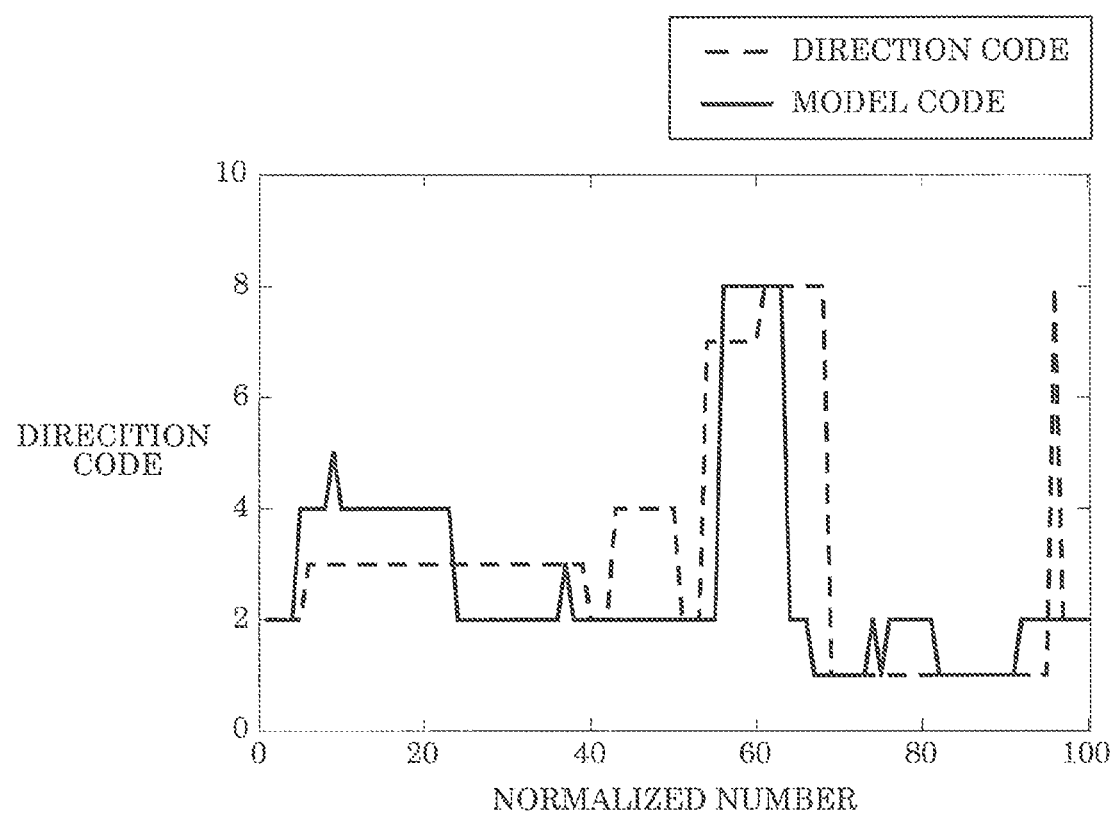
FIG. 10 illustrates test data obtained via measurement, and model data, i.e., model code.

Note that $C_{test, i}$ represents the i-th item element in the test data column, and $C_{model, i}$ represents the i-th item element in the model data column. Next, the total sum of squares of the direction code difference between the test data and the model data is calculated as the deviation illustrated in MATH. 27. For example, as illustrated in FIG. 10, by comparing the test data and the model data, deviation E for action determination is calculated via MATH. 27. FIG. 10 illustrates test data obtained via measurement, and model data, i.e., model code.

[MATH. 27]

$$E = \delta C_1^2 + C_2^2 + \ldots + \delta C_K^2 \qquad \text{(Expression 26)}$$

The action corresponding to the model data column exhibiting the smallest deviation is output as the estimated result.

Next, operations performed by sensor 10 according to Embodiment 1 will be described with reference to a flowchart.

Figure 11:
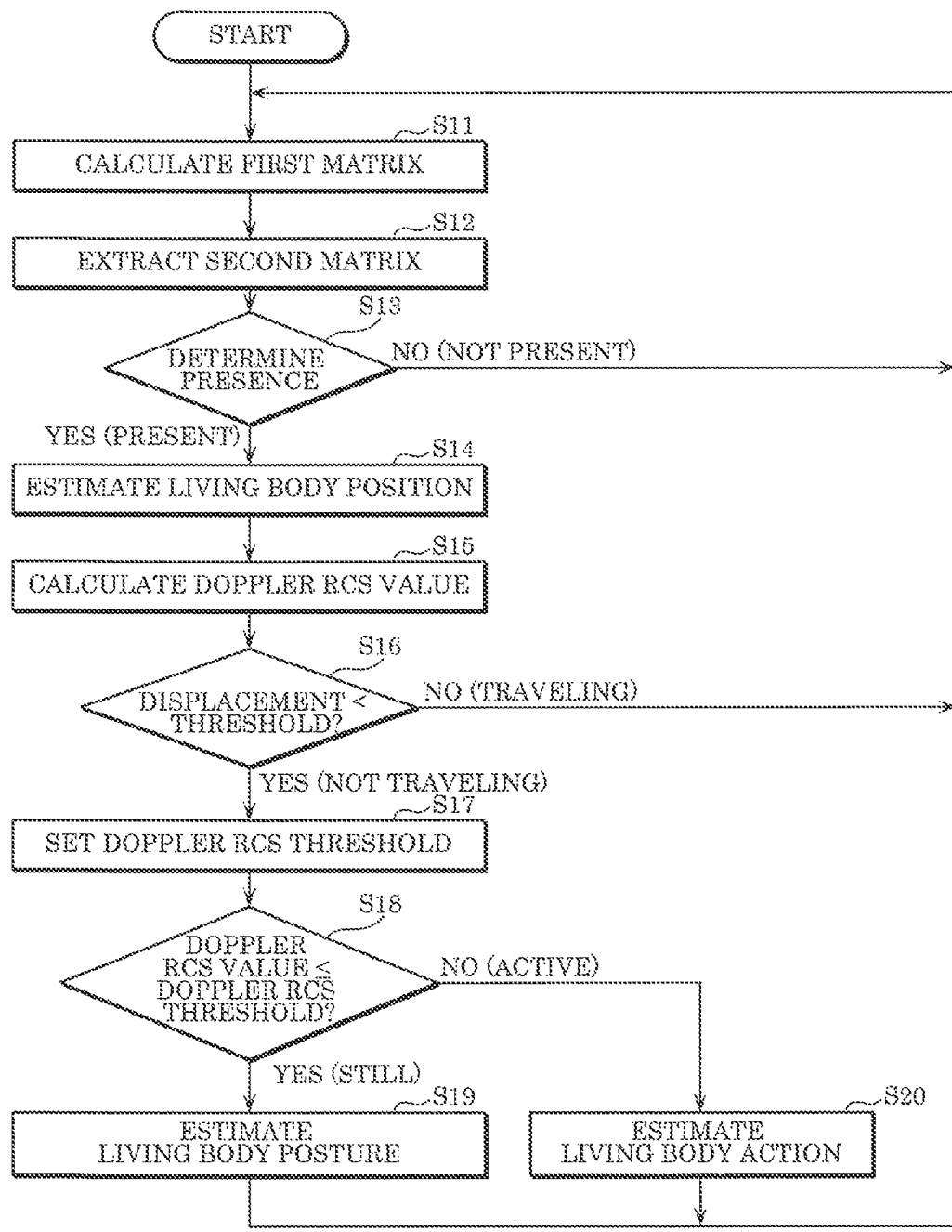
FIG. 11 is a flowchart illustrating one example of operations performed by the sensor according to Embodiment 1.

FIG. 11 is a flowchart illustrating one example of operations performed by the sensor according to Embodiment 1.

In sensor 10, the N transmission antenna elements 21 of transmission signal generator 20 transmit N transmission signals to a predetermined range in which living body 50 is possibly present.

The M reception antenna elements 31 of receiver 30 receive N reception signals including a plurality of reflected signals, which are the N transmission signals transmitted by transmission signal generator 20 that have reflected off living body 50.

Circuitry 40 successively calculates a N×M first matrix whose components are the complex transfer functions that indicate the propagation characteristics between each of the N transmission antenna elements 21 and each of the M reception antenna elements 31, from each of the N reception signals received in a predetermined period by the M reception antenna elements 31 (S11).

Circuitry 40 successively extracts second matrices corresponding to components affected by vital activity including at least any one of the respiration, heartbeat, and body motion of living body 50, by successively extracting second matrices corresponding to a predetermined frequency range in the first matrices (S12).

Circuitry 40 determines whether living body 50 is present in a predetermined range, exemplified as the effective range of sensor 10, by using the first and second matrices (S13). In step S13, person count estimation of estimating the number of living bodies in the predetermined range may be performed. After circuitry 40 determines living body 50 to be present in predetermined range (yes in S13), circuitry 40 proceeds to step S14, and after circuitry 40 determines no living body 50 to be present in predetermined range (no in S13), circuitry 40 returns to step S11 (S13).

In step S14, circuitry 40 successively estimates the position of living body 50 relative to sensor 10, by using the successively extracted second matrices (S14). Circuitry 40 then stores, in memory 41, the successively estimated positions of living body 50, in the order that they are estimated, a predetermined number of times.

Based on the successively estimated positions of the living body 50, the position of transmission signal generator 20, and the position of receiver 30, circuitry 40 successively calculates distance RT indicating the distance between living body 50 and transmission signal generator 20 and distance RR indicating the distance between living body 50 and receiver 30, and successively calculates Doppler RCS values for living body 50 by using the calculated distances RT and distances RR (S15).

Circuitry 40 determines whether the displacement of the position of living body 50 is less than a predetermined value, by using the positions of living body 50 stored the predetermined number of times in memory 41 (S16). For example, if the displacement is one meter or more in five seconds (no in S16), circuitry 40 determines that living body 50 is traveling, and returns to step S11. Note that the action of living body 50 may be determined to be traveling as a result of using this result. For example, if the displacement is less than one meter in five seconds (yes in S16), circuitry 40 determines that living body 50 is not traveling and proceeds to the next step, step S17.

Circuitry 40 references the previous posture stored in memory 41 and the average value of a predetermined number of past Doppler RCS values in memory 41, and sets the Doppler RCS threshold using a predetermined method (S17). Here, the Doppler RCS threshold may be set to a predetermined value for each of past postures, and may be set to a value obtained by multiplying the average of past Doppler RCS values by a predetermined rate, such as 1.5.

Circuitry 40 compares the calculated Doppler RCS value with the set Doppler RCS threshold, and determines whether or not the Doppler RCS value is less than or equal to the Doppler RCS threshold (S18).

When circuitry 40 determines that the calculated Doppler RCS value is less than or equal to the Doppler RCS threshold (yes in S18), circuitry 40 performs a posture estimation process for estimating the posture of living body 50 by posture estimation unit 490 (S19).

When circuitry 40 determines that the calculated Doppler RCS value is greater than the Doppler RCS threshold (no in S18), circuitry 40 performs an action estimation process for estimating the action of living body 50 by action estimation unit 500 (S20).

As specific examples of the processes performed by circuitry 40 have already been given in the descriptions of the functional components of circuitry 40, repeated description is omitted.

As described above, in steps S16 through S20, in accordance with at least one of the determination result of the travel determining and the determination result of the Doppler RCS threshold determining, at least one of estimation of the posture of living body 50 and estimation of the action of the living body is selectively performed.

Figure 12:
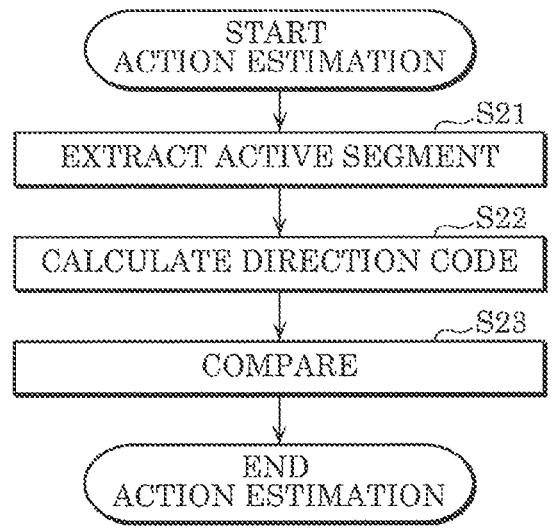
FIG. 12 is a flowchart illustrating a first example of the action estimation process according to Embodiment 1.

FIG. 12 is a flowchart illustrating a first example detailing the action estimation process.

Circuitry 40 extracts, as an active period during which living body 50 is active, a period in which a temporal change in a vertical position among estimated positions or in calculated Doppler RCS values is greater than a predetermined value (S21).

Circuitry 40 transforms, using a predetermined method, the extracted temporal change in the active period, which is a temporal change of either a vertical position obtained from estimated positions or calculated Doppler RCS values, into a directional vector, and normalizes the transformed directional vector to calculate a direction code (S22).

Circuitry 40 estimates the action of living body 50 by identifying the action associated with the time series data of the calculated direction code in information 42 that indicates correspondences and is stored in memory, by comparing the time series data and information 42 indicating the correspondences (S23).

Next, pre-training operations in sensor 10 for obtaining information 42 indicating correspondences will be described.

Circuitry 40 receives an input for identifying a predetermined operation via an input means not illustrated in the drawings. With this, circuitry 40 recognizes an operation performed during a predetermined period as an operation indicated by the received input. Next, the same processes as described in steps S11 through S22 and steps S21, S22 described above that pertain to the operations performed by sensor 10 are performed in order.

Next, circuitry 40 stores, as training data in memory 41, information indicating correspondences obtained by associating the operation received by the input means with the time series data of the calculated direction code. Information indicating correspondences is generated and stored in memory 41 by repeating the above-described pre-training for each action performed by the living body.

With sensor 10 according to this embodiment, in accordance with at least one of the determination result of the travel determining and the determination result of the Doppler RCS threshold determining, at least one of estimation of the posture of living body 50 and estimation of the action of living body 50 is selectively performed. Accordingly, the state of a living body, which is any one of the traveling of living body 50, the posture of living body 50, and the action of living body 50, can be rapidly and highly precisely estimated.

With sensor 10 according to this embodiment, it is possible to rapidly and highly precisely estimate the position of living body 50 and the state of living body 50 at that position, such as whether living body 50 is present, absent, still, or traveling, or the posture or action of living body 50.

Sensor 10 detects the presence of living body 50 by detecting a moving body part. Employing this makes it possible to, for example, estimate whether a person is alive and which posture of standing upright, sitting, sitting cross-legged, and lying face-down the person is assuming. This makes it possible to effectively check whether a person is alive. Moreover, since it is possible to check whether a person is alive without having to analyze an image captured by a camera, it is possible to check whether a person is alive while protecting the privacy of the person.

Variation 1 of Embodiment 1

In Embodiment 1, in the action estimation processes performed by circuitry 40, a trajectory of a combination of the vertical position and Doppler RCS value of living body 50 is stored in memory 41 as training data, and an action is estimated by calculating a correlation between the training data and the trajectory of a combination of the estimated vertical position of living body 50 and the calculated Doppler RCS value of living body 50, but this example is not limiting. Action estimation unit 500 may perform, for example, the process illustrated in the flowchart of FIG. 13 as the process for estimating the action of living body 50.

Figure 13:
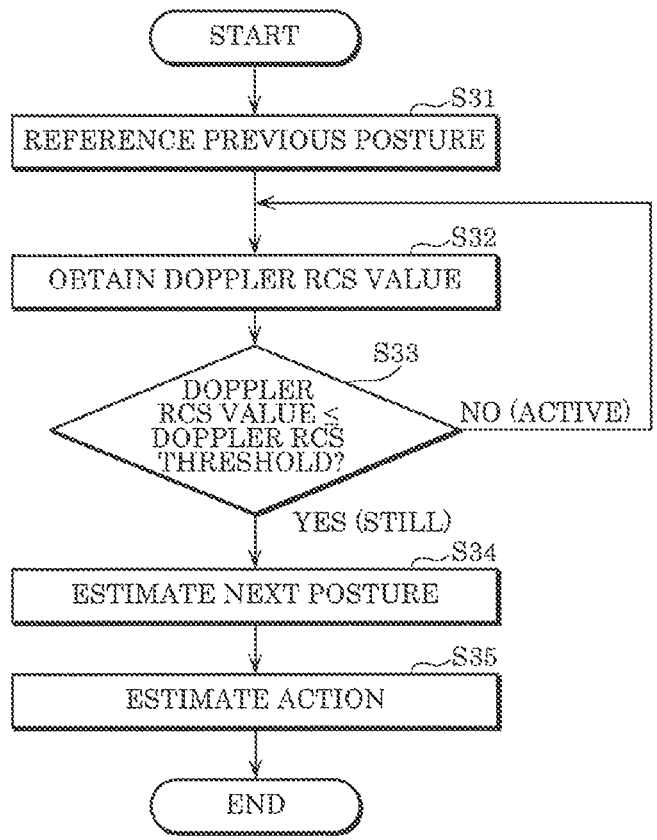
FIG. 13 is a flowchart illustrating a second example of the action estimation process according to Embodiment 1.

FIG. 13 is a flowchart illustrating a second example of the action estimation process according to Embodiment 1.

Each time the posture is estimated, posture estimation unit 490 in circuitry 40 stores the estimated posture in memory 41.

Action estimation unit 500 references the most recent posture of living body 50 stored in memory 41, and obtains the most recent posture as the previous posture to be used in the estimation of the action of living body 50 (S31).

Action estimation unit 500 then obtains, in sequential order, the successively calculated Doppler RCS values (S32). Action estimation unit 500 obtains, from memory 41, the Doppler RCS values stored in memory 41 in the order that they were calculated.

Action estimation unit 500 determines whether the obtained Doppler RCS value is less than or equal to the Doppler RCS threshold (S33).

When action estimation unit 500 determines that the Doppler RCS value is less than or equal to the Doppler RCS threshold (yes in S33), action estimation unit 500 causes posture estimation unit 490 to estimate the posture of living body 50, and obtains the estimated posture as a next posture in an activity (S34). In other words, action estimation unit 500 waits until living body 50 is still, by waiting until the Doppler RCS value is less than or equal to the Doppler RCS threshold, and estimates the posture of living body 50 estimated from N reception signals at the timing that the Doppler RCS value becomes less than or equal to the Doppler RCS threshold, as the next posture. Action estimation unit 500 can obtain an accurate next posture by obtaining, as the next posture, the posture after living body 50 becomes still.

Action estimation unit 500 estimates the action of living body 50 by using the obtained previous posture and the estimated next posture (S35). For example, by referencing correspondences, which are associations of a previous posture, a next posture, and an action, illustrated in the table in FIG. 14, action estimation unit 500 identifies an action associated with the combination of the previous and next postures in the correspondence to estimate the action of living body 50. Note that FIG. 14 illustrates one example of correspondences between pairs of previous and next postures and an action, in another example of action estimation according to Embodiment 1.

Variation 2 of Embodiment 1

For example, as illustrated in FIG. 14, since what the next posture, which is the posture transitioned to from the previous posture via an action, can be is limited, action estimation unit 500 may narrow down the selection of possible subsequent actions, once the previous posture is identified. In other words, the next postures in FIG. 14 can also be interpreted as transitionable postures. By employing this, when the previous posture is identified, the action may be estimated by dividing selections of actions that may be performed after the identified previous posture, as shown in the flowchart of FIG. 15.

Figure 15:
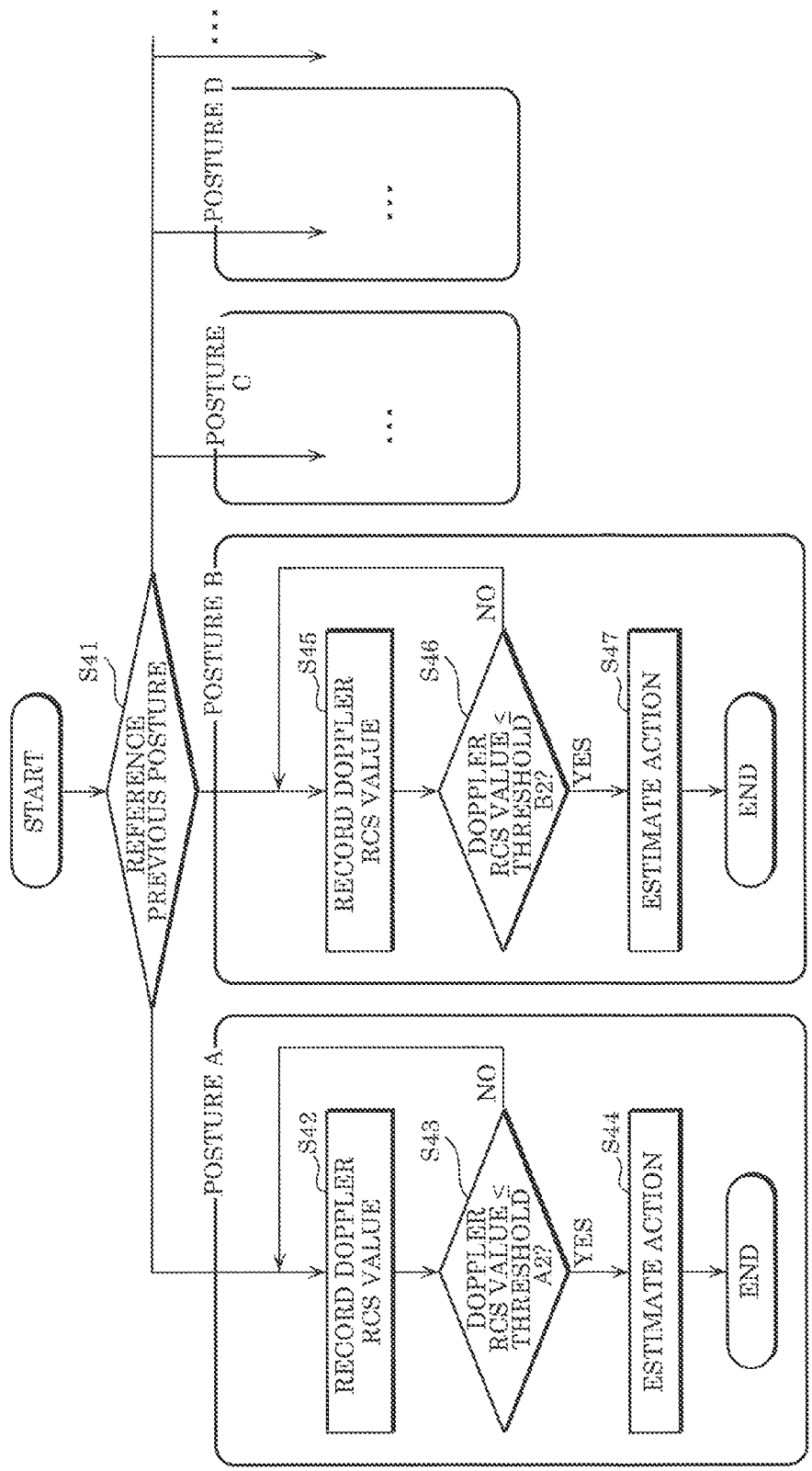
FIG. 15 is a flowchart illustrating a third example of the action estimation process according to Embodiment 1.

FIG. 15 is a flowchart illustrating a third example of the action estimation process according to Embodiment 1.

Action estimation unit 500 references the most recent posture of living body 50 stored in memory 41, and obtains the most recent posture as the previous posture to be used in the estimation of the action of living body 50 (S41). When the previous posture is posture A, action estimation unit 500 proceeds to step S42. Posture A is, for example, standing.

Action estimation unit 500 performs steps S42 and S43. As steps S42 and S43 are the same as previously described steps S32 and S33, repeated description is omitted.

In step S44, action estimation unit 500 references the correspondences in FIG. 14, and since the obtained previous posture is "standing", narrows down the choices for the next posture to either "recumbent" or "sitting", and estimates the action (S44). More specifically, posture estimation unit 490 tasked with estimating the next posture estimates the next posture to be whichever one of "recumbent" and "sitting" is closest to the estimation result. For example, either "sitting" or "recumbent" is estimated to be the next posture of living body 50 by comparing the combination of the vertical position and Doppler RCS value of living body 50 with training data for "sitting" and "recumbent".

Similarly, when the previous posture is posture B, action estimation unit 500 proceeds to step S45. Although the previous posture is different, since the processes performed in steps S45 through S47 are the same as the processes performed in steps S42 through S44, repeated description is omitted.

Variation 3 of Embodiment 1

Figure 17:
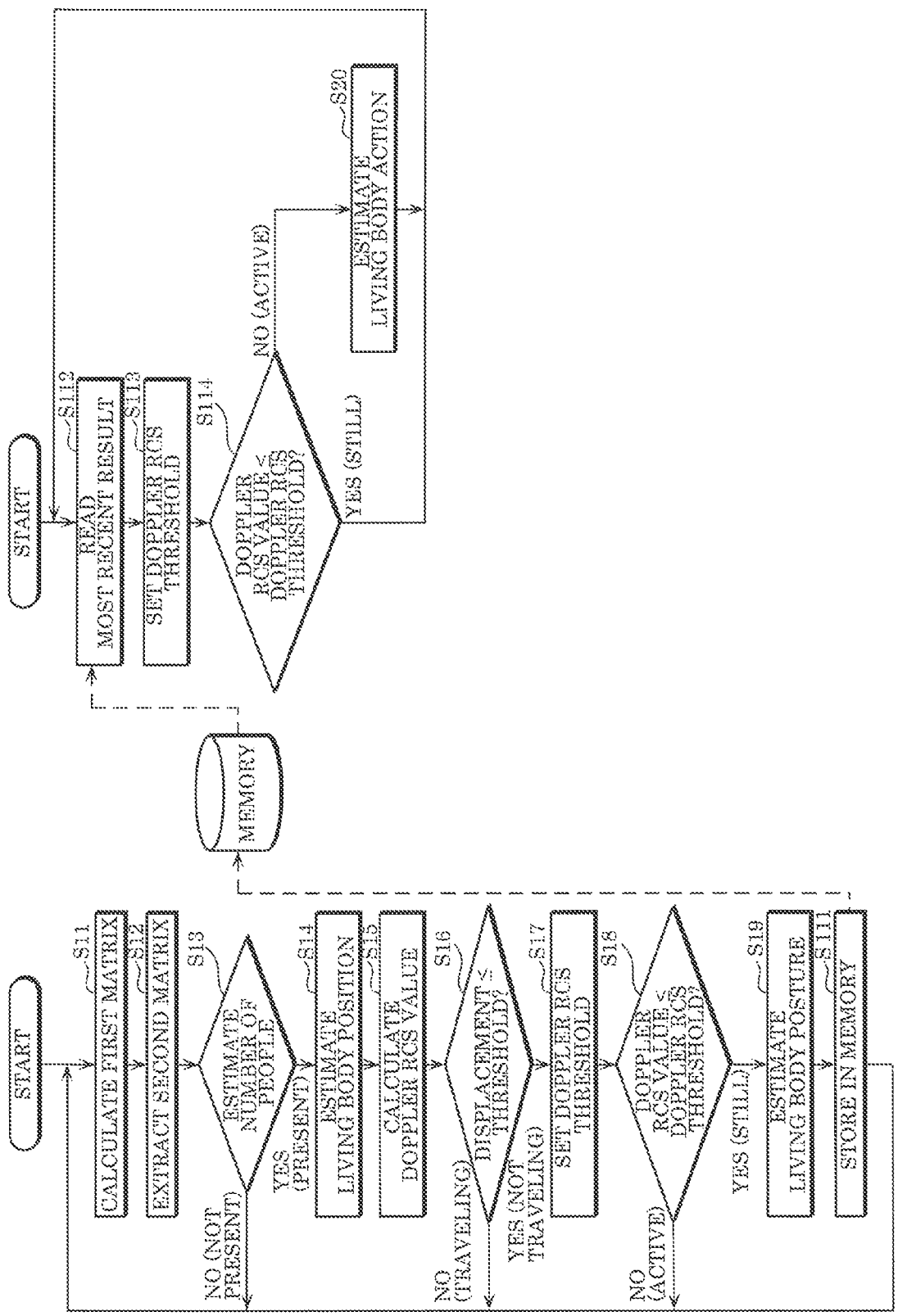
FIG. 17 is a flowchart illustrating one example of another version of the operations performed by the sensor according to Embodiment 1.
Figure 18:
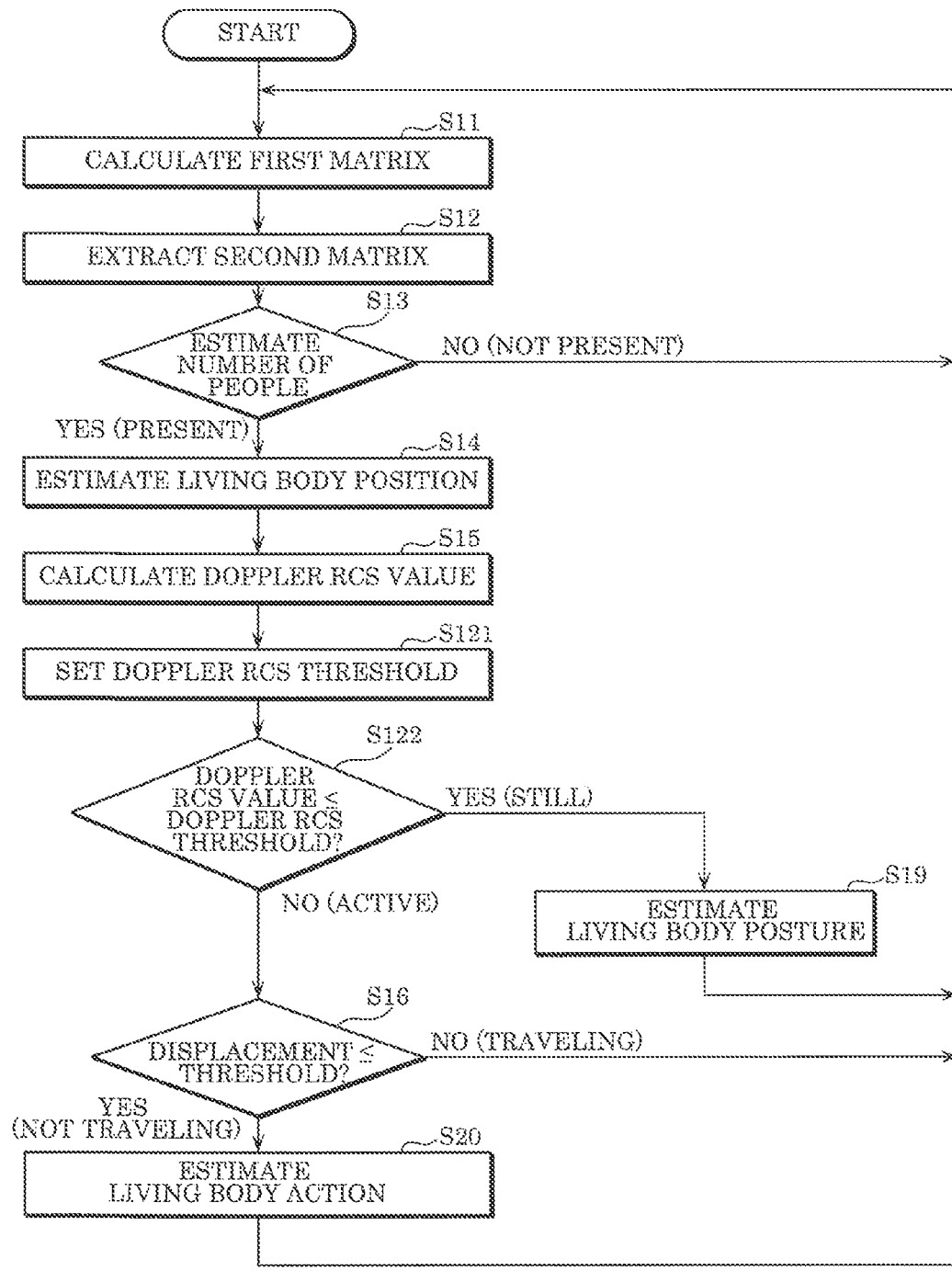
FIG. 18 is a flowchart illustrating one example of another version of the operations performed by the sensor according to Embodiment 1.

Note that the flowcharts illustrating operations performed by sensor 10 presented in Embodiment 1 are mere examples. By storing, in memory 41, the first and second matrices, positional information on living body 50, Doppler RCS and such as illustrated in FIG. 16 and FIG. 17, post-processing can be delegated to a server or other computer, and as illustrated in FIG. 18, Doppler RCS threshold determining can be performed first.

Figure 16:
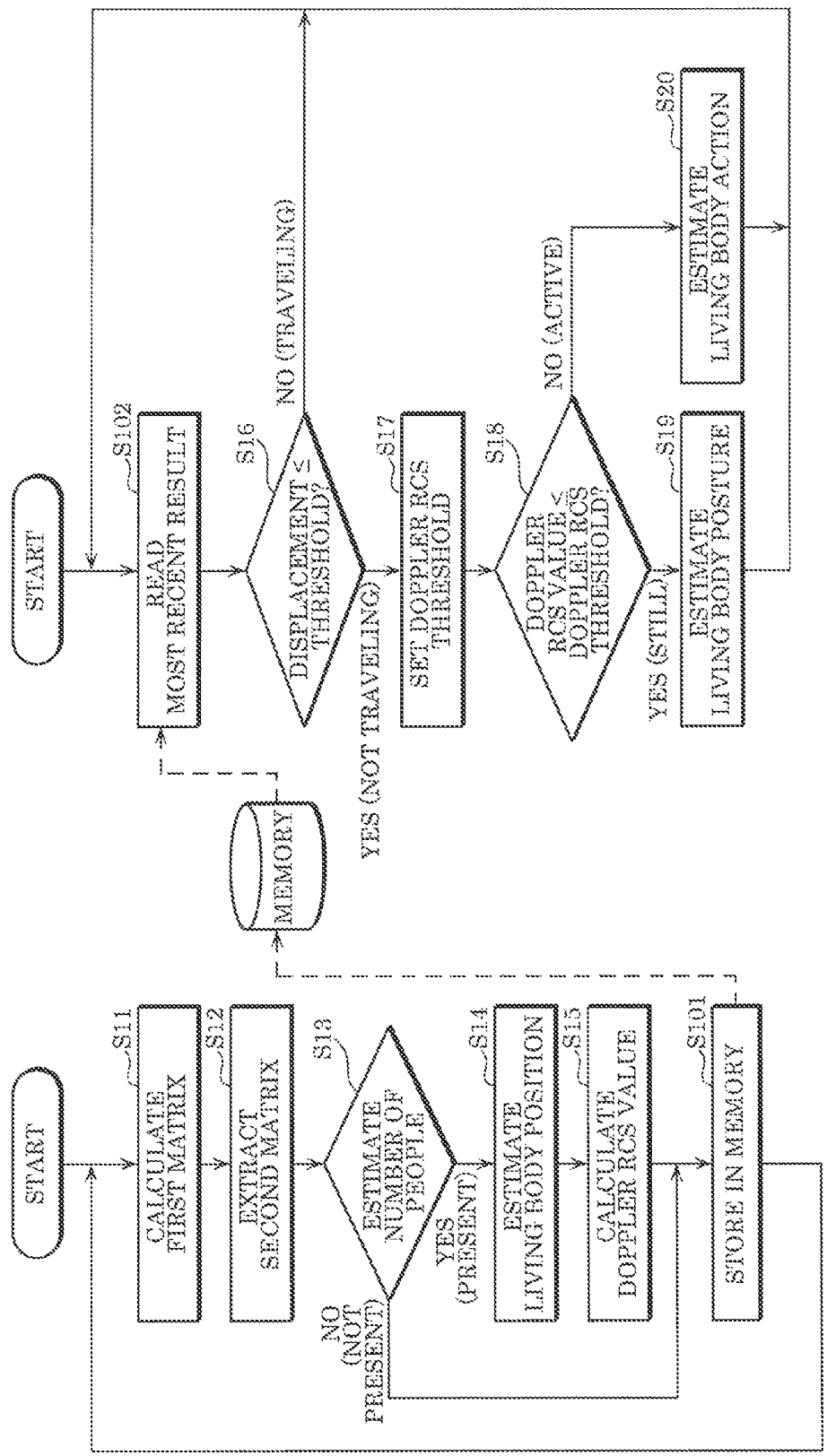
FIG. 16 is a flowchart illustrating one example of another version of the operations performed by the sensor according to Embodiment 1.

FIG. 16 is a flowchart illustrating one example of another version of the operations performed by the sensor according to Embodiment 1.

As illustrated in FIG. 16, circuitry 40 in sensor 10 may perform steps S11 through S15 separately from steps S16 through S20 in FIG. 11. In other words, a first device that executes steps S11 through S15 and a second device that executes steps S16 through S20 may be different.

First, the first device executes steps S11 through S15. Next, the results of steps S11 through S15 are stored in memory (S101). Note that the memory used in step S101 may be memory included in the first device, may be memory included in the second device, and may be memory included in a device other than the first or second device.

Next, the second device reads the most recent result from memory (S102). Then, the second device executes steps S16 through S20.

Note that the first and second devices each include circuitry and memory.

FIG. 17 is a flowchart illustrating one example of another version of the operations performed by the sensor according to Embodiment 1.

As illustrated in FIG. 17, circuitry 40 in sensor 10 may perform steps S11 through S19 separately from step S20 in FIG. 11. In other words, a third device that executes steps S11 through S19 and a fourth device that executes step S20 may be different.

First, the third device executes steps S11 through S19. Next, the results of steps S11 through S19 are stored in memory (S111). Note that the memory used in step S101 may be memory included in the third device, may be memory included in the fourth device, and may be memory included in a device other than the third or fourth device.

Next, the fourth device reads the most recent result from memory (S112).

Then, the fourth device sets the Doppler RCS threshold (S113), and determines whether or not the Doppler RCS value from the most recent result is less than or equal to the Doppler RCS threshold (S114).

When the Doppler RCS value is greater than the Doppler RCS threshold (no in S114), the fourth device executes step S20. When the Doppler RCS value is less than or equal to the Doppler RCS threshold (yes in S114), processing returns to step S112.

FIG. 18 is a flowchart illustrating one example of another version of the operations performed by the sensor according to Embodiment 1.

Like in steps S121 and S122 in FIG. 18, the setting of the Doppler RCS threshold and the Doppler RCS threshold determining may be performed before the travel determining for determining whether living body 50 is traveling or not.

In this case, just like in step S17, circuitry 40 references the previous posture stored in memory 41 and the average value of a predetermined number of past Doppler RCS values in memory 41, and sets the Doppler RCS threshold using a predetermined method (S121).

Next, just like in step S18, circuitry 40 compares the calculated Doppler RCS value with the set Doppler RCS threshold, and determines whether or not the Doppler RCS value is less than or equal to the Doppler RCS threshold (S122).

When circuitry 40 determines that the calculated Doppler RCS value is less than or equal to the Doppler RCS threshold (yes in S122), circuitry 40 performs a posture estimation process for estimating the posture of living body 50 by posture estimation unit 490 (S19), and returns to step S11.

When the calculated Doppler RCS value is greater than the Doppler RCS threshold (no in S18), circuitry 40 executes step S16, and when the amount of displacement is less than or equal to a threshold (yes in S16), circuitry 40 estimates the action of living body 50 (S20), and returns to step S11.

When the amount of displacement is greater than the threshold (no in S16), circuitry 40 determines that living body 50 is traveling, and returns to step S11.

Embodiment 2

In circuitry 40 according to Embodiment 1, one posture or one action of living body 50 at a given timing is estimated, but this example is not limiting. For example, a posture probability or an action probability of living body 50 may be estimated as the posture and action of living body 50. The posture probability of living body 50 is the probability that each of one or more predetermined postures assumable by living body 50 will be estimated. The action probability of living body 50 is the probability that each of one or more predetermined actions assumable by living body 50 will be estimated.

Figure 19:
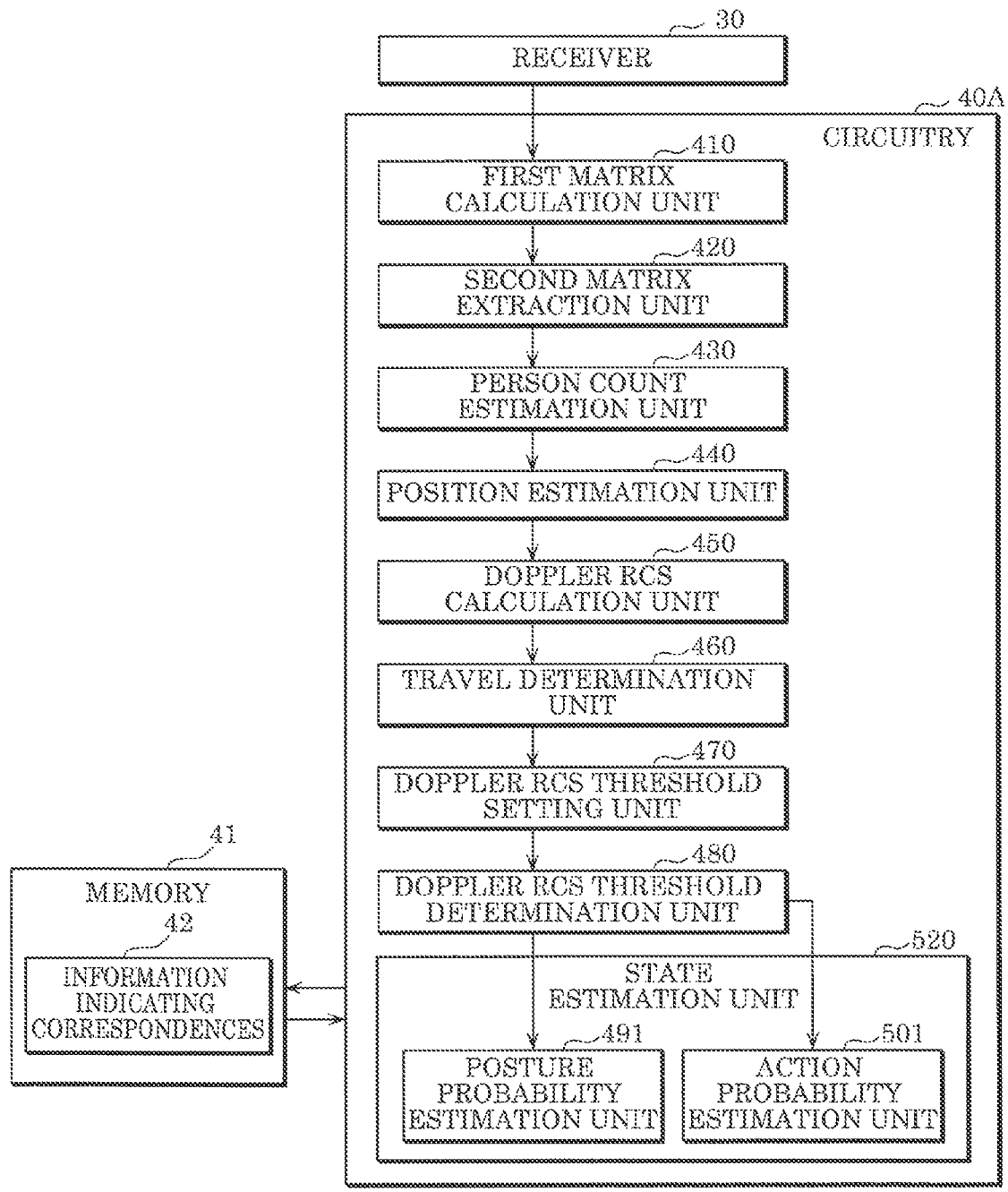
FIG. 19 is a block diagram illustrating the functional configuration implemented via circuitry and memory according to Embodiment 2.

FIG. 19 is a block diagram illustrating the functional configuration implemented via circuitry and memory according to Embodiment 2.

Circuitry 40A according to Embodiment 2 differs from circuitry 40 according to Embodiment 1 in that posture estimation unit 490 and action estimation unit 500 are replaced by posture probability estimation unit 491 and action probability estimation unit 501, respectively.

Figure 20:
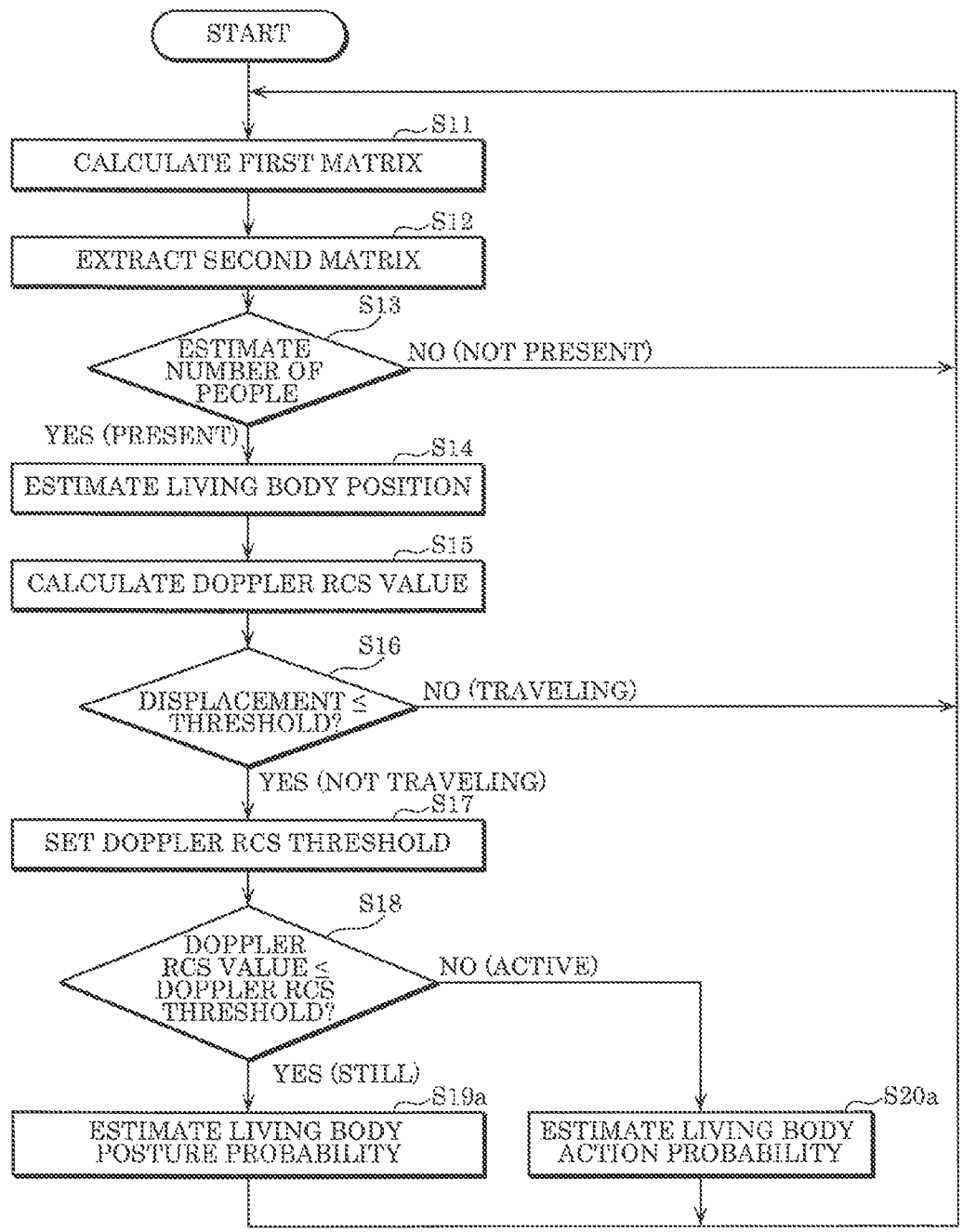
FIG. 20 is a flowchart illustrating one example of operations performed by a sensor according to Embodiment 2.

FIG. 20 is a flowchart illustrating one example of operations performed by the sensor according to Embodiment 2.

In Embodiment 2, steps S19 and S20 are replaced with steps S19a and S20a, respectively. Step S19a will be described with reference to FIG. 21 through FIG. 23.

Figure 21:
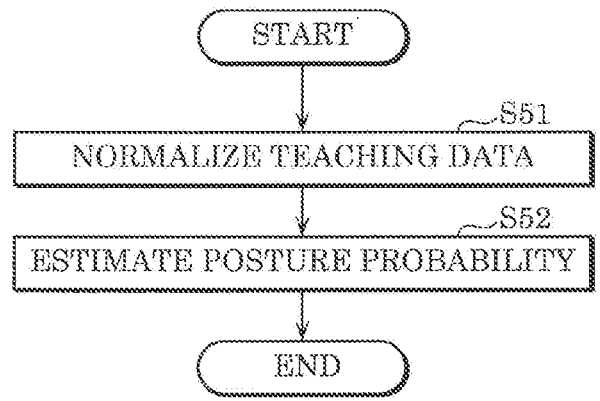
FIG. 21 is a flowchart illustrating one example of operations performed by a posture probability estimation unit according to Embodiment 2.
Figure 22:
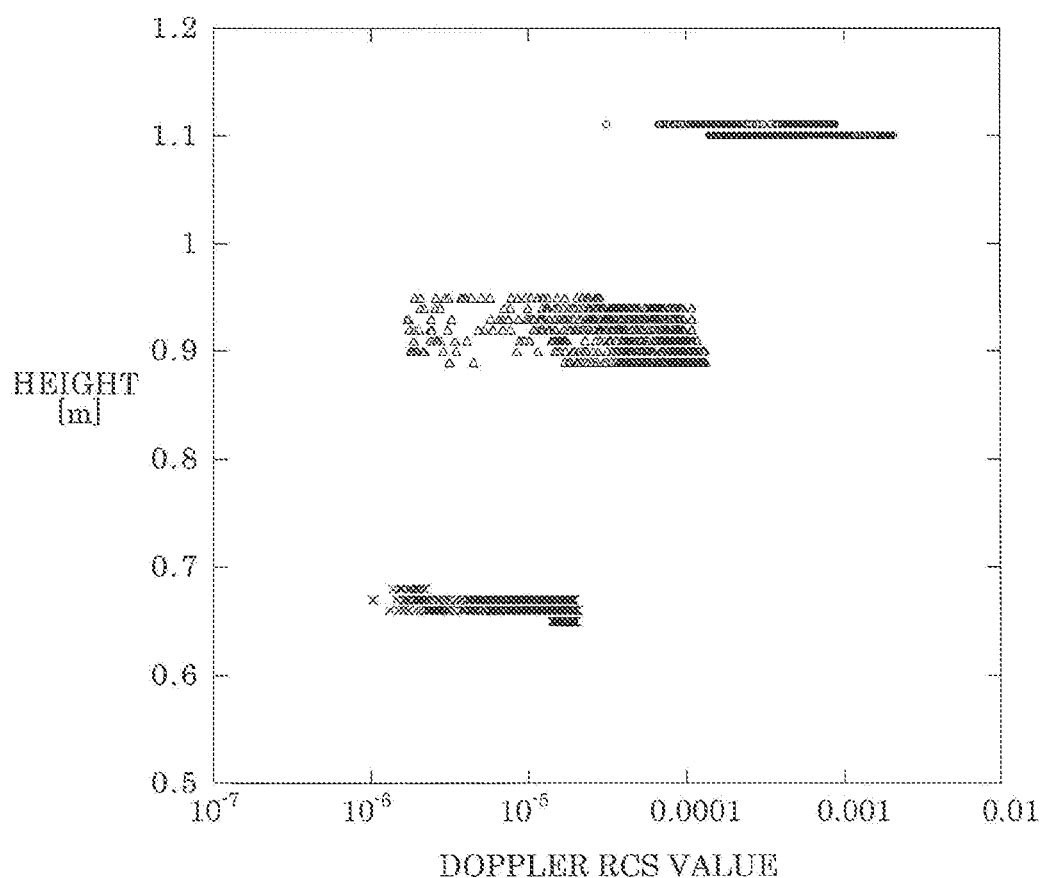
FIG. 22 illustrates one example of training data used in the estimation of posture probability according to Embodiment 2.

FIG. 21 is a flowchart illustrating one example of the posture probability estimation process performed by the posture probability estimation unit. FIG. 22 illustrates one example of training data used in the estimation of posture probability according to Embodiment 2.

Posture probability estimation unit 491 first normalizes training data for estimating a posture (S51). Posture probability estimation unit 491 may implement step S51 each time the training data is updated. In the normalization of training data, for example, as illustrated in FIG. 22, in order to inhibit variances in height directions in the raw training data, for example, data that is greater than or equal to 70% and data that is less than or equal to 30% is deleted from the training data for each posture. Here, the range set for deleting the data differs depending on the installation situation and application of sensor 10A. Next, using Expressions 27 and 28, height information and Doppler RCS information is normalized.

[MATH. 28]

$$\hat{z}^i_{std} = \frac{z^i - \mu_z}{\sigma_z} \quad \text{(Expression 27)}$$

[MATH. 29]

$$\sigma^i_{std} = \frac{\sigma^i - \mu_\sigma}{\sigma_\sigma} \quad \text{(Expression 28)}$$

Figure 23:
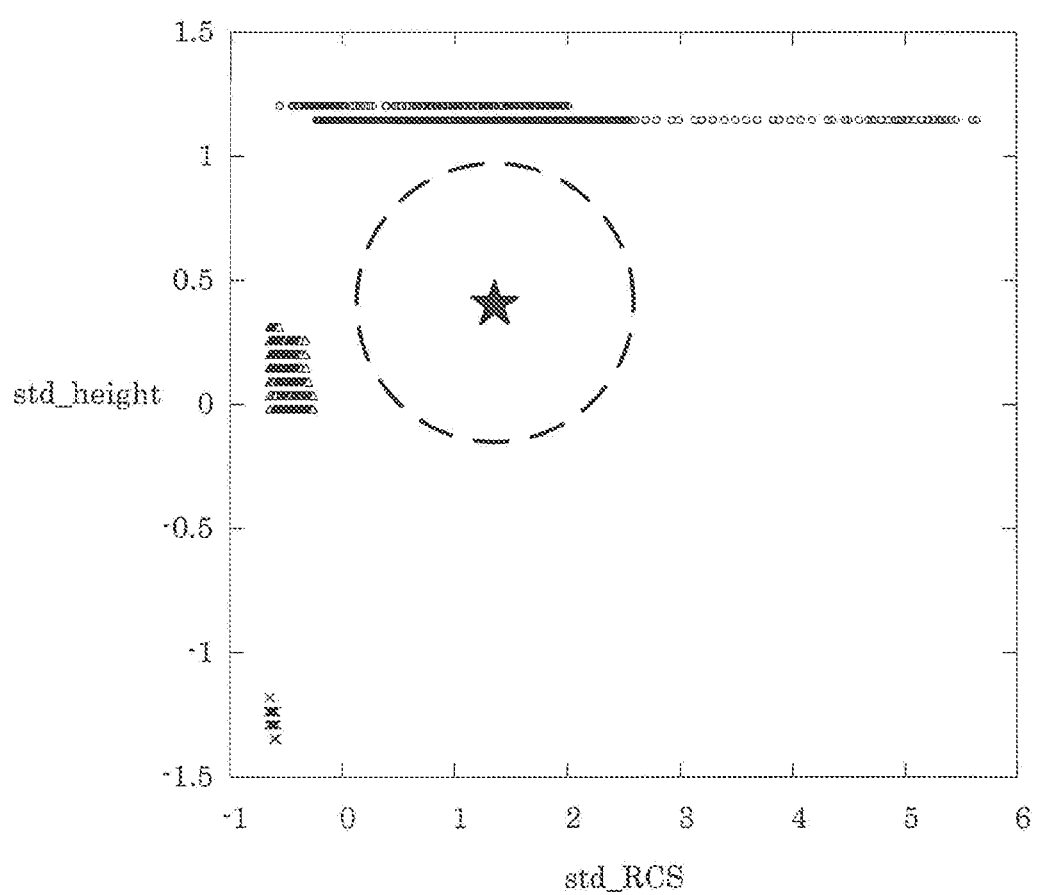
FIG. 23 illustrates one example of the posture estimation and the normalization of training data obtained by posture probability estimation according to Embodiment 2.

Here, $Z^i_{std}$ is the i-th normalized training data for vertical positions, $Z^i$ is the i-th training data for vertical positions, $\mu_z$ is the average vertical position, $\sigma_z$ is the dispersion of vertical positions, $\sigma^i_{std}$ is the Doppler RCS i-th normalized training data, $\sigma^i$ is the Doppler RCS i-th training data, $\mu_o$ is the Doppler RCS average, and $\sigma_o$ is the Doppler RCS dispersion. An example of the calculation results is illustrated in FIG. 23. Note that FIG. 23 illustrates one example of the posture estimation and the normalization of training data obtained by posture probability estimation according to Embodiment 2.

In FIG. 23, for example, when the measurement data is located at the start, posture probability estimation unit 491 extracts, for example, 100 points of data in the surrounding area, and performs posture probability estimation (S52). For example, when 70 of the extracted 100 points indicates "standing" and 30 of the extracted 100 points indicates "sitting", posture probability estimation unit 491 calculates, as the posture of living body 50, an posture probability estimation value of 70% standing, 30% sitting.

Figure 24:
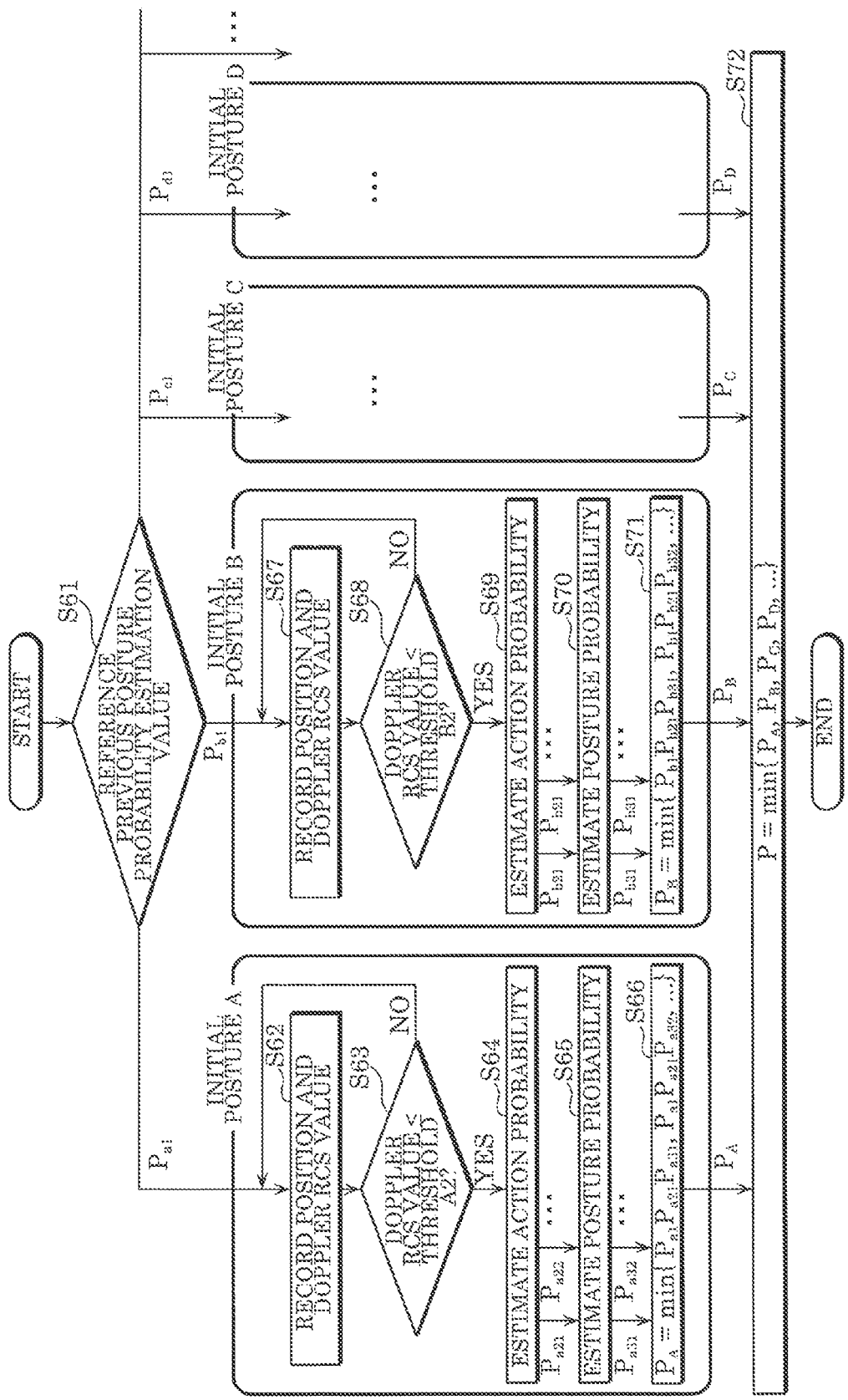
FIG. 24 illustrates one example of action probability estimation performed by an action probability estimation unit according to Embodiment 2.

FIG. 24 is a flowchart illustrating one example of the action probability estimation process performed by the action probability estimation unit.

As described above with reference to FIG. 21 through FIG. 23, in Embodiment 2, posture probability estimation unit 491 calculates a posture probability estimation value, and the calculated posture probability estimation value is successively stored in memory 41.

Action probability estimation unit 501 references the most recent posture probability estimation value for living body 50 stored in memory 41, and obtains a plurality of initial postures indicated by a plurality of posture probabilities included in the most recent posture probability estimation value (S61).

Action probability estimation unit 501 calculates the probability of a possible action for each posture probability in the plurality of initial postures. For example, in step S61, the posture probability of initial posture A is estimated to be $P_{a1}$, the posture probability of initial posture B is estimated to be $P_{b1}$, the posture probability of initial posture C is estimated to be $P_{c1}$, and the posture probability of initial posture D is estimated to be $P_{d1}$.

Hereinafter, initial posture A will be described.

Action probability estimation unit 501 performs steps S62 and S63. Steps S62 and S63 differ from steps S32 and S33 in that vertical position is further recorded in step S62, but all other points are the same. In other words, by action probability estimation unit 501 executing steps S62 and S63, action probability estimation unit 501 waits while recording until the Doppler RCS value is less than or equal to the Doppler RCS threshold, and proceeds to step S64 at the timing that the Doppler RCS value becomes less than or equal to the Doppler RCS threshold. Note that in step S64, deviation E for action determination is calculated using a predetermined method or Expression 26.

Next, action probability estimation unit 501 calculates initial posture correction term $B_i$ as the posture probability, by using Expression 29 based on posture probability estimation value $P_i$ for the initial posture reference from memory 41.

[MATH. 30]

$$B_i = C^{1-P_i} \quad \text{(Expression 29)}$$

Here, C may be an arbitrary natural number. Furthermore, the post-action posture probability is calculated by posture probability estimation unit 491, and post-action posture correction term $A_i$ is calculated using the same method as given in Expression 29 (S64). Note that in this embodiment, since deviation E for action determination is a variable that indicates correlation between the training data and a given code, the action when E is the smallest is taken as the result. Accordingly, for $B_i$ as well, so long as the variable is smallest when the most probably posture is assumed, any formula may be used.

Thereafter, corrected probability deviation $E_{pi}$ is calculated via Expression 30. With this, $P_A$ of initial posture A in step S66 is calculated.

[MATH. 31]

$$E_{pi} = A_i * B_i * E_i \quad \text{(Expression 30)}$$

Here, $E_i$ is the result of calculating deviation E for action determination for each code in the training data.

In this way, in steps S61 through S66, posture probability $P_{a1}$ of initial posture A, action probabilities $P_{a21}$, $P_{a22}$, ..., for each of the plurality of actions identified based on initial posture A are calculated in step S64, and posture probabilities $P_{a31}$, $P_{a32}$, ..., for post-posture results of the plurality of actions performed after initial posture A are calculated in step S65. In step S66, the lowest value of the mathematical products of each possible combination of the three posture probabilities of 1) posture probability $P_{a1}$ of initial posture A, 2) one of the plurality of action probabilities $P_{a21}$, $P_{a22}$, ..., and 3) one of the plurality of post-posture probabilities $P_{a31}$, $P_{a32}$, ..., is calculated as action probability $P_A$.

Initial steps S67 through S71 for initial posture B corresponding to steps S62 through S66 for initial posture A are repeatedly executed, and the same applies for the other initial postures C, D, and so on.

Action probability estimation unit 501 compares $P_A$, $P_B$, $P_C$, $P_D$, ..., as the corrected probability deviation $E_{pi}$ calculated in all initial postures A, B, C, D, ..., and identifies the smallest as the action of the living body (S72).

INDUSTRIAL APPLICABILITY

The present disclosure can be used in a sensor and estimating method that estimate the direction and/or position of a moving body, by using radio signals. In particular, the present disclosure can be used in a measuring device that measures the direction and/or position of a moving body, including a living bodies and machines, a household appliance that performs control according to the direction and/or position of the moving body, a direction estimating method included in a monitoring device that detects incursion of a moving body, and various estimating devices that utilize a direction estimating method, a position estimating method, and a scattered cross section.

What is claimed is:

1. A sensor, comprising:
a transmission signal generator including N transmission antenna elements that respectively transmit N transmission signals to a predetermined range in which a living body is possibly present, where N is a natural number greater than or equal to 3;
a receiver including M reception antenna elements that respectively receive N reception signals including one or more reflected signals, where M is a natural number greater than or equal to 3, the one or more reflected signals being one or more of the N transmission signals transmitted by the N transmission antenna elements that is reflected or scattered by the living body;
a circuitry; and
a memory,
wherein the circuitry includes:
a first matrix calculation unit configured to calculate, for each of N×M possible antenna element combinations of one of the N transmission antenna elements and one of the M reception antenna elements, a complex transfer function indicating a propagation characteristic between the transmission antenna element and the reception antenna element in the combination to obtain N×M complex transfer functions, from the N reception signals received in a predetermined period by the M reception antenna elements, to successively calculate an N×M first matrix whose components are the N×M complex transfer functions calculated;
a second matrix extraction unit configured to successively extract a second matrix corresponding to components affected by vital activity including at least any one of a respiration, a heartbeat, and a body motion of the living body, by successively extracting a matrix corresponding to a predetermined frequency range in the N×M first matrix successively calculated by the first matrix calculation unit;
a presence determination unit configured to determine whether the living body is present in the predetermined range by using a predetermined method;
a position estimation unit configured to, after the presence determination unit determines that the living body is present in the predetermined range, successively estimate a position of the living body relative to the sensor, by using the second matrix successively extracted by the second matrix extraction unit;
a Doppler radar cross section (RCS) calculation unit configured to (i) successively calculate a first distance and a second distance based on the position of the living body successively estimated by the position estimation unit, a position of the transmission signal generator, and a position of the receiver, the first distance indicating a distance between the transmission signal generator and the position of the living body successively estimated, and the second distance indicating a distance between the living body and the receiver, and (ii) successively calculate a Doppler RCS value for the living body, by using the first distance and the second distance calculated;
a travel determination unit configured to store the position of the living body successively estimated into the memory a predetermined number of times, sequentially in an order of an estimation, and based on the positions of the living body stored the predetermined number of times into the memory, determine that the living body is traveling when a positional displacement of the living body is greater than or equal to a predetermined value, and determine that the living body is not traveling when the positional displacement is less than the predetermined value;
a Doppler RCS threshold setting unit configured to set a Doppler RCS threshold by using a predetermined method;
a Doppler RCS threshold determination unit configured to determine whether or not the Doppler RCS value calculated is less than or equal to the Doppler RCS threshold set, by comparing the Doppler RCS value and the Doppler RCS threshold; and
a state estimation unit configured to selectively perform at least one of an estimation of a posture of the living body and an estimation of an action of the living body, in accordance with at least one of a determination result according to the travel determination unit and a determination result according to the Doppler RCS threshold determination unit.

2. The sensor according to claim 1, wherein the state estimation unit is configured to: estimate the posture of the living body when the travel determination unit determines that the living body is not traveling and the Doppler RCS threshold determination unit determines that the Doppler RCS value is less than or equal to the Doppler RCS threshold; and
estimate the action of the living body when the Doppler RCS threshold determination unit determines that the Doppler RCS value is greater than the Doppler RCS threshold.

3. The sensor according to claim 1, wherein
the state estimation unit is configured to determine the action of the living body to be traveling when the travel determination unit determines that the living body is traveling.

4. The sensor according to claim 1, wherein
at least three of the N transmission antenna elements are arranged in different positions in vertical and horizontal directions,
at least three of the M reception antenna elements are arranged in different positions in the vertical and horizontal directions,
the memory stores an information indicating correspondences between (i) pairs of vertical positions of the living body in the vertical direction relative to the sensor and Doppler RCS values, (ii) and postures of the living body,
the position estimation unit is configured to estimate, as the position of the living body, a three-dimensional position including a vertical position of the living body in the vertical direction relative to the sensor, and
the state estimation unit is configured to estimate the posture of the living body, by using the Doppler RCS value calculated, the vertical position estimated, and the information that indicates the correspondences and is stored in the memory.

5. The sensor according to claim 1, wherein
at least three of the N transmission antenna elements are arranged in different positions in vertical and horizontal directions,
at least three of the M reception antenna elements are arranged in different positions in the vertical and horizontal directions,
the memory stores an information indicating correspondences between (i) pairs of vertical positions of the living body in the vertical direction relative to the sensor and Doppler RCS values, (ii) and postures of the living body, the position estimation unit is configured to estimate, as the position of the living body, a three-dimensional position including a vertical position of the living body in the vertical direction relative to the sensor, and the state estimation unit is configured to estimate a posture probability as the posture of the living body, by using the Doppler RCS value calculated, the vertical position estimated, and the information that indicates the correspondences and is stored in the memory, the posture probability being a probability of one or more predetermined postures assumable by the living body.

6. The sensor according to claim 1, wherein the state estimation unit is configured to, after successively estimating the posture of the living body by using the Doppler RCS value successively calculated and the position of the living body successively estimated, store the postures of the living body successively estimated into the memory, and the Doppler RCS threshold setting unit is configured to set the Doppler RCS threshold in accordance with the posture of the living body estimated most recently among the postures of the living body stored in the memory.

7. The sensor according to claim 1, wherein the state estimation unit is configured to:

after successively estimating the posture of the living body by using the Doppler RCS value successively calculated and the position of the living body successively estimated, store the postures of the living body successively estimated into the memory;

before estimating a subsequent posture of the living body, wait until the Doppler RCS value successively calculated becomes less than or equal to the Doppler RCS threshold, and estimate a next posture to be the posture of the living body estimated from the N reception signals at a timing that the Doppler RCS value becomes less than or equal to the Doppler RCS threshold; and estimate the action of the living body by using a previous posture and the next posture estimated, the previous posture being the posture of the living body that was immediately previously estimated and is stored in the memory.

8. The sensor according to claim 1, wherein the state estimation unit is configured to:

after successively estimating the posture of the living body by using the Doppler RCS value successively calculated and the position of the living body successively estimated, store the postures of the living body successively estimated into the memory;

wait until the Doppler RCS value successively calculated becomes less than or equal to the Doppler RCS threshold;

estimate, at a timing that the Doppler RCS value becomes less than or equal to the Doppler RCS threshold, one or more next actions of the living body by using a previous posture, the previous posture being the posture of the living body that was immediately previously estimated and is stored in the memory; and estimate the action of the living body by identifying one action from among the one or more next actions estimated, by using the Doppler RCS value successively calculated and the position of the living body successively estimated.

9. The sensor according to claim 1, wherein the state estimation unit is configured to:

after successively estimating the posture of the living body by using the Doppler RCS value successively calculated and the position of the living body successively estimated, store the postures of the living body successively estimated into the memory;

wait until the Doppler RCS value successively calculated becomes less than or equal to the Doppler RCS threshold;

estimate, at a timing that the Doppler RCS value becomes less than or equal to the Doppler RCS threshold, one or more next actions of the living body by using a previous posture, the previous posture being the posture of the living body that was immediately previously estimated and is stored in the memory; and estimate, as the action of the living body, an action probability, by using the Doppler RCS value successively calculated and the position of the living body successively estimated, the action probability being a probability of each of the one or more next actions estimated.

10. The sensor according to claim 1, wherein the presence determination unit is configured to estimate a total number of the living bodies present in the predetermined range, and determine that the living body is not present in the predetermined range when the total number of the living bodies is estimated to be zero, and determine that the living body is present in the predetermined range when the total number of the living bodies is estimated to be one or more.

11. An estimating device comprising a circuitry and a memory, wherein the circuitry includes:

an obtaining unit configured to obtain N reception signals received in a predetermined period by M reception antenna elements, from a receiver including the M reception antenna elements that respectively receive the N reception signals including one or more reflected signals, the one or more reflected signals being one or more of N transmission signals that is reflected or scattered by a living body, the N transmission signals being transmitted by a transmission signal generator including N transmission antenna elements that respectively transmit the N transmission signals to a predetermined range in which the living body is possibly present, where M is a natural number greater than or equal to 3, and N is a natural number greater than or equal to 3;

a first matrix calculation unit configured to calculate, for each of N×M possible antenna element combinations of one of the N transmission antenna elements and one of the M reception antenna elements, a complex transfer function indicating a propagation characteristic between the transmission antenna element and the reception antenna element in the combination to obtain N×M complex transfer functions, from the N reception signals obtained, to successively calculate an N×M first matrix whose components are the N×M complex transfer functions calculated;

a second matrix extraction unit configured to successively extract a second matrix corresponding to components affected by a vital activity including at least any one of a respiration, a heartbeat, and a body motion of the living body, by successively extracting a matrix corresponding to a predetermined frequency range in the N×M first matrix successively calculated by the first matrix calculation unit;

a presence determination unit configured to determine whether the living body is present in the predetermined range by using a predetermined method;

a position estimation unit configured to, after the presence determination unit determines that the living body is present in the predetermined range, successively estimate a position of the living body relative to the transmission signal generator and the receiver, by using the second matrix successively extracted by the second matrix extraction unit;

a Doppler radar cross section (RCS) calculation unit configured to (i) successively calculate a first distance and a second distance based on the position of the living body successively estimated by the position estimation unit, a position of the transmission signal generator, and a position of the receiver, the first distance indicating a distance between the living body and the transmission signal generator, and the second distance indicating a distance between the living body and the receiver, and (ii) successively calculate a Doppler RCS value for the living body, by using the first distance and the second distance calculated;

a travel determination unit configured to store the position successively estimated into the memory a predetermined number of times, sequentially in an order of an estimation, and based on the positions of the living body stored the predetermined number of times into the memory, determine that the living body is traveling when a positional displacement of the living body is greater than or equal to a predetermined value, and determine that the living body is not traveling when the positional displacement is less than the predetermined value;

a Doppler RCS threshold setting unit configured to set a Doppler RCS threshold by using a predetermined method;

a Doppler RCS threshold determination unit configured to determine whether or not the Doppler RCS value calculated is less than or equal to the Doppler RCS threshold set, by comparing the Doppler RCS value and the Doppler RCS threshold; and a state estimation unit configured to selectively perform one of an estimation of a posture of the living body and an estimation of an action of the living body, in accordance with at least one of a determination result according to the travel determination unit and a determination result according to the Doppler RCS threshold determination unit.

12. An estimating method performed in an estimating device including a circuitry and a memory, the estimating method comprising:

obtaining N reception signals received in a predetermined period by M reception antenna elements, from a receiver including the M reception antenna elements that respectively receive the N reception signals including one or more reflected signals, the one or more reflected signals being one or more of N transmission signals that is reflected or scattered by a living body, the N transmission signals being transmitted by a transmission signal generator including N transmission antenna elements that respectively transmit the N transmission signals to a predetermined range in which the living body is possibly present, where M is a natural number greater than or equal to 3, and N is a natural number greater than or equal to 3;

calculating, for each of N×M possible antenna element combinations of one of the N transmission antenna elements and one of the M reception antenna elements, a complex transfer function indicating a propagation characteristic between the transmission antenna element and the reception antenna element in the combination to obtain N×M complex transfer functions, from the N reception signals obtained, to successively calculate an N×M first matrix whose components are the N×M complex transfer functions calculated;

successively extracting a second matrix corresponding to components affected by a vital activity including at least any one of a respiration, a heartbeat, and a body motion of the living body, by successively extracting a matrix corresponding to a predetermined frequency range in the N×M first matrix successively calculated;

determining whether the living body is present in the predetermined range by using a predetermined method;

after determining that the living body is present in the predetermined range, successively estimating a position of the living body relative to the transmission signal generator and the receiver, by using the second matrix successively extracted;

successively calculating a first distance indicating a distance between the transmission signal generator and the living body and a second distance indicating a distance between the living body and the receiver based on the position of the living body successively estimated, a position of the transmission signal generator, and a position of the receiver;

successively calculating a Doppler radar cross section (RCS) value for the living body, by using the first distance and the second distance calculated;

storing the position of the living body successively estimated into the memory a predetermined number of times, sequentially in an order of an estimation;

performing, based on the positions of the living body stored the predetermined number of times into the memory, a travel determining including determining that the living body is traveling when a positional displacement of the living body is greater than or equal to a predetermined value, and determining that the living body is not traveling when the positional displacement is less than the predetermined value;

setting a Doppler RCS threshold by using a predetermined method;

performing a Doppler RCS threshold determining including determining whether or not the Doppler RCS value calculated is less than or equal to the Doppler RCS threshold set, by comparing the Doppler RCS value and the Doppler RCS threshold; and selectively perform one of an estimation of a posture of the living body and an estimation of an action of the living body, in accordance with at least one of a determination result of the travel determining and a determination result of the Doppler RCS threshold determining.

13. A non-transitory computer-readable recording medium having recorded thereon a program for causing a computer to execute, in an estimating device including a circuitry and a memory:

obtaining N reception signals received in a predetermined period by M reception antenna elements, from a receiver including the M reception antenna elements that respectively receive the N reception signals including one or more reflected signals, the one or more reflected signals being one or more of N transmission signals that is reflected or scattered by a living body, the N transmission signals being transmitted by a transmission signal generator including N transmission antenna elements that respectively transmit the N transmission signals to a predetermined range in which the living body is possibly present, where M is a natural number greater than or equal to 3, and N is a natural number greater than or equal to 3;

calculating, for each of N×M possible antenna element combinations of one of the N transmission antenna elements and one of the M reception antenna elements, a complex transfer function indicating a propagation characteristic between the transmission antenna element and the reception antenna element in the combination to obtain N×M complex transfer functions, from the N reception signals obtained, to successively calculate an N×M first matrix whose components are the N×M complex transfer functions calculated;

successively extracting a second matrix corresponding to components affected by a vital activity including at least any one of a respiration, a heartbeat, and a body motion of the living body, by successively extracting a matrix corresponding to a predetermined frequency range in the N×M first matrix successively calculated;

determining whether the living body is present in the predetermined range by using a predetermined method;

after determining that the living body is present in the predetermined range, successively estimating a position of the living body relative to the transmission signal generator and the receiver, by using the second matrix successively extracted;

successively calculating a first distance indicating a distance between the transmission signal generator and the living body and a second distance indicating a distance between the living body and the receiver based on the position of the living body successively estimated, a position of the transmission signal generator, and a position of the receiver;

successively calculating a Doppler radar cross section (RCS) value for the living body, by using the first distance and the second distance calculated;

storing the position of the living body successively estimated into the memory a predetermined number of times, sequentially in an order of an estimation;

performing, based on the positions of the living body stored the predetermined number of times into the memory, a travel determining including determining that the living body is traveling when a positional displacement of the living body is greater than or equal to a predetermined value, and determining that the living body is not traveling when the positional displacement is less than the predetermined value;

setting a Doppler RCS threshold by using a predetermined method;

performing a Doppler RCS threshold determining including determining whether or not the Doppler RCS value calculated is less than or equal to the Doppler RCS threshold set, by comparing the Doppler RCS value and the Doppler RCS threshold; and selectively perform one of an estimation of a posture of the living body and an estimation of an action of the living body, in accordance with at least one of a determination result of the travel determining and a determination result of the Doppler RCS threshold determining.

* * * * *